(12) United States Patent
Yamaguchi

(10) Patent No.: US 12,540,034 B2
(45) Date of Patent: Feb. 3, 2026

(54) ARTICLE STORAGE DEVICE AND PICKING SYSTEM PROVIDED WITH ARTICLE STORAGE DEVICE

(71) Applicant: FANUC CORPORATION, Yamanashi (JP)

(72) Inventor: Shunji Yamaguchi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 543 days.

(21) Appl. No.: 18/001,543

(22) PCT Filed: Jun. 18, 2021

(86) PCT No.: PCT/JP2021/023256
§ 371 (c)(1),
(2) Date: Dec. 12, 2022

(87) PCT Pub. No.: WO2021/261407
PCT Pub. Date: Dec. 30, 2021

(65) Prior Publication Data
US 2023/0219757 A1    Jul. 13, 2023

(30) Foreign Application Priority Data

Jun. 23, 2020  (JP) ................................. 2020-108183

(51) Int. Cl.
*B65G 1/137*    (2006.01)
*B65G 47/90*    (2006.01)

(52) U.S. Cl.
CPC ........... *B65G 1/1373* (2013.01); *B65G 47/90* (2013.01)

(58) Field of Classification Search
CPC ........ B65G 1/1373; B65G 47/90; B65G 1/02; B65G 1/08
See application file for complete search history.

(56) References Cited

FOREIGN PATENT DOCUMENTS

| CN | 106974571 A | 7/2017 | |
|---|---|---|---|
| CN | 107380867 A * | 11/2017 | ............... B65G 1/16 |

(Continued)

OTHER PUBLICATIONS

English Abstract and Machine Translation for Japanese Publication No. 6616969 B2, published Dec. 4, 2019, 25 pgs.

(Continued)

*Primary Examiner* — Jacob S. Scott
*Assistant Examiner* — Miraj T. Patel
(74) *Attorney, Agent, or Firm* — Fredrikson & Byron, P.A.

(57) ABSTRACT

In a recent article storage apparatus, it is required to be able to open and close the opening of a container by a simple operation while reducing the number of parts of the article storage apparatus.
An article storage apparatus includes a storage rack (12) on which a container (24) having an opening is set, and a lid (28) provided at a separate member from the container, and reciprocable between a closed position where the lid (28) closes the opening of the container (24) arranged at a predetermined position on the storage rack (12) and an open position where the lid (28) is retracted from the closed position to open the opening. Thereby, for example, when a plurality of containers (24) are sequentially arranged on the storage rack (12), the containers (24) can be opened and closed by a simple operation using a common lid (28).

14 Claims, 34 Drawing Sheets

(56) References Cited

FOREIGN PATENT DOCUMENTS

| | | | | |
|---|---|---|---|---|
| CN | 107742375 A | * | 2/2018 | ............. G07F 17/12 |
| CN | 208524700 U | | 2/2019 | |
| CN | 108529121 B | * | 10/2019 | ........... B65G 1/1373 |
| CN | 210102514 U | | 2/2020 | |
| JP | 5185177 A | | 7/1976 | |
| JP | 4649521 B2 | | 3/2011 | |
| JP | 2015118161 A | | 6/2014 | |
| JP | 5713268 B2 | | 5/2015 | |
| JP | 2016031619 A | | 3/2016 | |
| JP | 6616969 B2 | | 12/2019 | |

OTHER PUBLICATIONS

English Abstract and Machine Translation for Japanese Publication No. 5713268 B2, published May 7, 2015, 38 pgs.
English Abstract and Machine Translation for Japanese Publication No. 2015-118161 A, published Jun. 30, 2014, 32 pgs.
English Abstract and Machine Translation for Japanese Publication No. 4649521 B2, published Mar. 9, 2011, 55 pgs.
English Machine Translation for Japanese Publication No. 5185177 A, published Jul. 26, 1976, 8 pgs.
English translation of PCT International Search Report dated Nov. 2, 2021 for International Application No. PCT/JP2021/029930, from which the instant application is based, 2 pgs.

* cited by examiner

ARTICLE STORAGE DEVICE AND PICKING SYSTEM PROVIDED WITH ARTICLE STORAGE DEVICE

RELATED APPLICATIONS

This application is a 35 U.S.C. 371 national phase filing from International Application No. PCT/JP2021/023256, filed Jun. 18, 2021, which claims priority to Japanese Application No. 2020-108183, filed, Jun. 23, 2020, the contents of which are incorporated herein by reference.

TECHNICAL FIELD

The present invention relates to an article storage apparatus and a picking system including an article storage apparatus.

BACKGROUND ART

An article storage apparatus in which a lid that can be opened and closed is provided at a container is known (e.g., Patent Literature 1).

CITATION LIST

Patent Literature

Patent Literature 1: JP 2014-118161 A

SUMMARY OF INVENTION

Technical Problem

In the related art, it has been required to be able to open and close the opening of a container by a simple operation while reducing the number of parts of the article storage apparatus.

Solution to Problem

According to one aspect of the present invention, an article storage apparatus includes a storage rack on which a container having an opening is set, and a lid provided at a separate member from the container, and reciprocable between a closed position where the lid closes the opening of the container arranged at a predetermined position on the storage rack and an open position where the lid is retracted from the closed position to open the opening.

Advantageous Effects of Invention

According to the present disclosure, when a plurality of containers are sequentially arranged on the storage rack, the containers can be opened and closed by a simple operation using a common lid. This can achieve both a reduction in the number of parts and a simplification of tasks.

DESCRIPTION OF EMBODIMENTS

Figure 1:
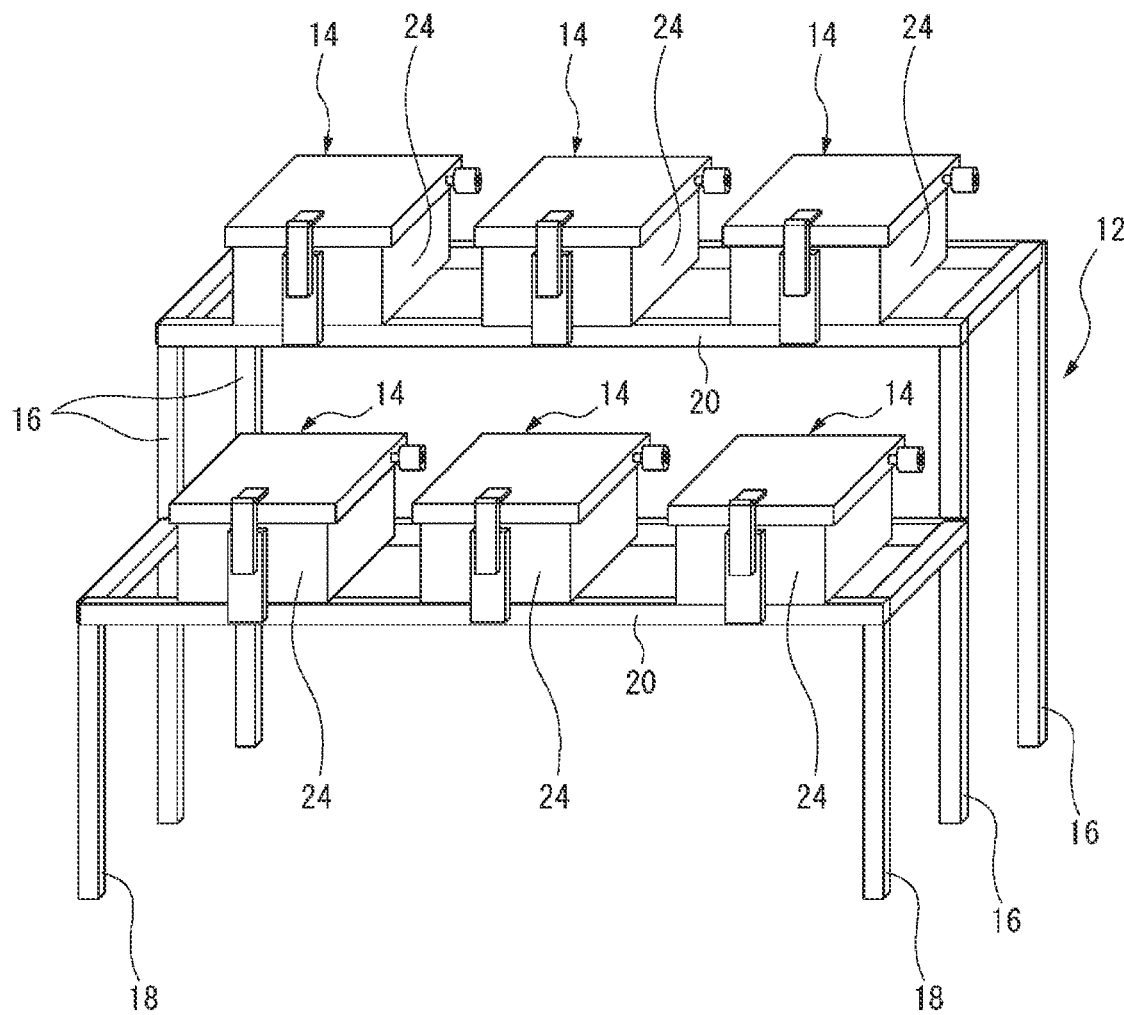
FIG. 1 is a diagram of an article storage apparatus according to an embodiment.

Hereinafter, embodiments of the present disclosure will be described in detail with reference to the drawings. In various embodiments described below, the same elements are designated by the same reference numerals and duplicate description will be omitted. In the following description, an orthogonal coordinate system in each drawing is used as a reference for directions, and for the sake of convenience, a positive x-axis direction is referred to as toward the right side, a positive y-axis direction is referred to as toward the front, and a positive z-axis direction is referred to as toward the upper side.

First, an article storage apparatus 10 according to an embodiment will be described with reference to FIGS. 1 and 2. The article storage apparatus 10 includes a storage rack 12 and a plurality of lid mechanisms 14 provided at the storage rack 12. The storage rack 12 includes a plurality of long pillars 16, a plurality of short pillars 18, and container installation frames 20. Each of the long pillars 16 and the short pillars 18 is fixed on the floor of a work cell and extends straight in the z-axis direction (e.g., in a vertical direction).

In the present embodiment, two container installation frames 20 are fixed to upper ends of the long pillars 16 and the short pillars 18, respectively, such that the two container installation frames 20 are displaced from each other in the z-axis direction, and each of the container installation frames 20 is arranged inclined with respect to an xy plane (e.g., a horizontal plane) such that it is directed upward toward the front. The inclination angle of each container installation frame 20 with respect to the xy plane is, for example, 10°. A plurality of containers 24 are detachably set on each of the container installation frames 20.

Each container 24 is hollow and has an opening 26 (FIG. 5) at its upper end. The containers 24 store articles used for robotic tasks such as bolts, nuts, or connecting rods which will be described later. Containers 24 set on each container installation frame 20 are each arranged at a predetermined set position SP in the container installation frame 20.

Each container 24 is positioned at the set position SP, for example, by a jig (not illustrated) provided at the container installation frame 20 or a positioning member that will be described later. When containers 24 are set at respective set positions SP on each container installation frame 20, the containers 24 are aligned on each of the container installation frame 20 at substantially equal intervals in the x-axis direction as illustrated in FIG. 1.

The plurality of lid mechanisms 14 have the same configuration as each other. In the present embodiment, three lid mechanisms 14 are arranged on each container installation frame 20 such that they are arrayed at substantially equal intervals in the x-axis direction. Hereinafter, the configuration of each lid mechanism 14 will be described with reference to FIGS. 3 and 4. Each lid mechanism 14 includes a lid 28, fixed members 30 and 32, a movable member 34, and a rotary gripping section 36.

The lid 28 has a substantially quadrangular outer shape and includes a first surface 38 and a second surface 40 opposite to the first surface 38. The fixed member 30 is fixed at a predetermined position on the container installation frame 20, for example, by a fastener such as a bolt or welding and the like and extends upward from the container installation frame 20. The fixed member 32 is fixed to the fixed member 30, for example, by a fastener such as a bolt or welding and the like and is thereby fixed to the container installation frame 20 via the fixed member 30. The fixed member 32 extends upward from an upper end of the fixed member 30.

The movable member 34 is movably provided at the fixed member 32. More specifically, the movable member 34 is rotatably provided at the fixed member 32 via a hinge shaft 42. The hinge shaft 42 extends substantially parallel to the x-axis and the movable member 34 rotates with respect to the fixed member 32 about the hinge shaft 42. The fixed member 32, the movable member 34, and the hinge shaft 42 constitute one hinge. The movable member 34 is fixed to one end of the lid 28 (a rear end thereof in the arrangement illustrated in FIGS. 3 and 4), for example, by a fastener such as a bolt or welding and the like. In the present embodiment, the movable member 34 is fixed to the second surface 40 of the lid 28.

Figure 3:
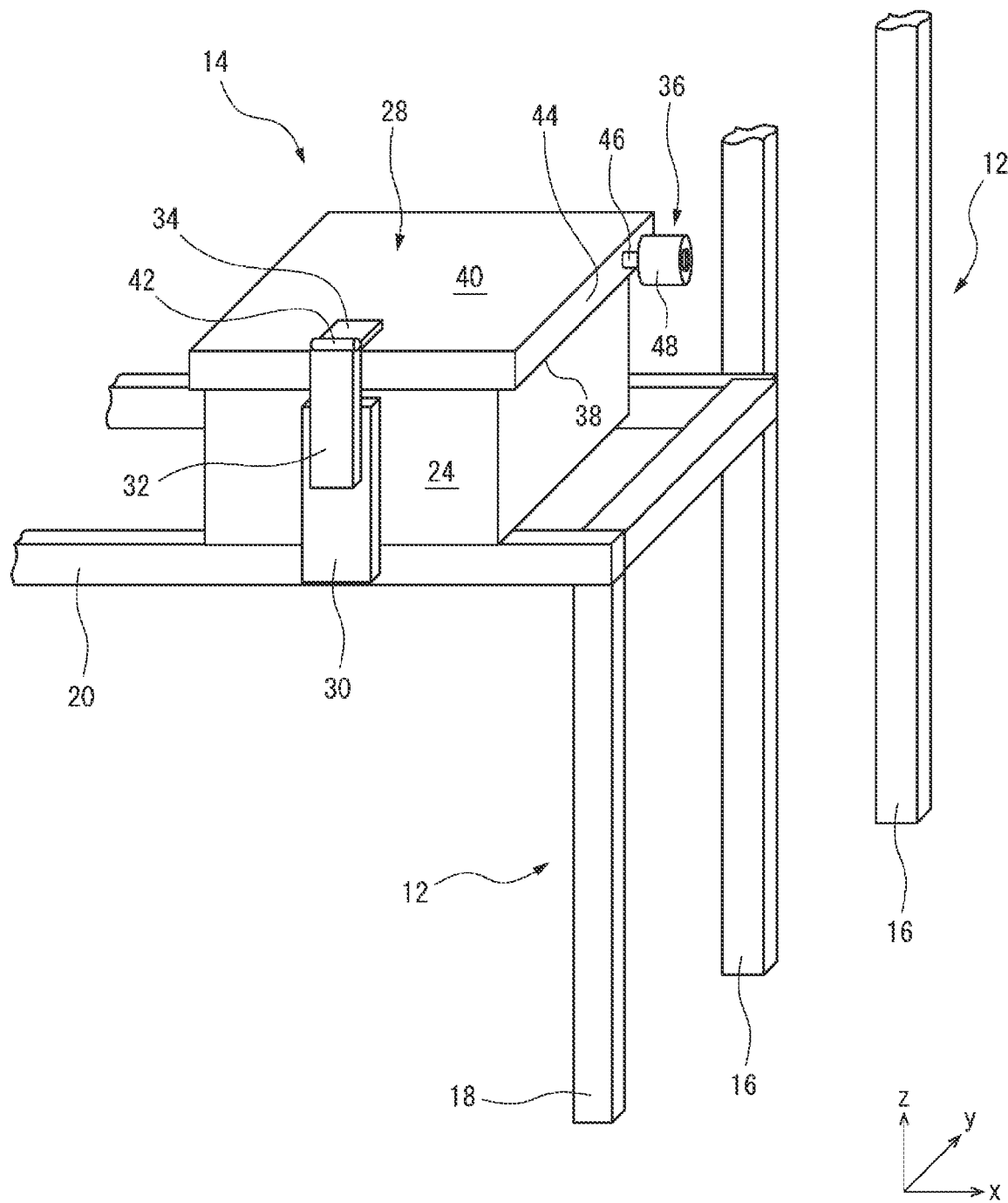
FIG. 3 is an enlarged view of one of the lid functions illustrated in FIG. 1.
Figure 4:
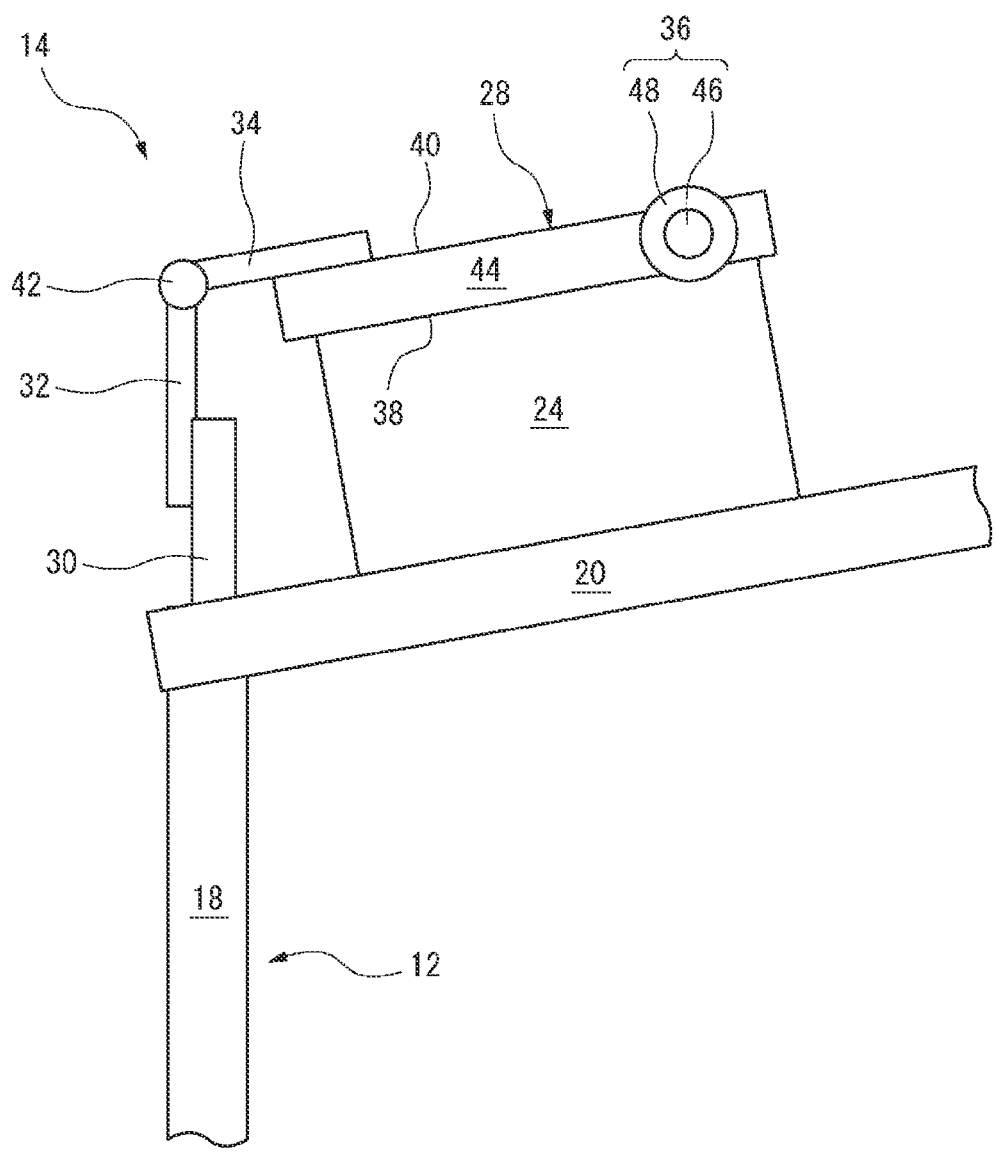
FIG. 4 is a side view of the lid mechanism illustrated in FIG. 3.

The rotary gripping section 36 is provided at an end of the lid 28 opposite to the movable member 34 (a front end thereof in the arrangement illustrated in FIGS. 3 and 4). More specifically, the rotary gripping section 36 includes a gripping shaft 46 and a gripping ring 48. The gripping shaft 46 is fixed to a right side surface 44 of the lid 28 such that it protrudes to the right from the right side surface 44. The gripping ring 48 is attached to the gripping shaft 46 such that it is rotatable about the gripping shaft 46.

Figure 5:
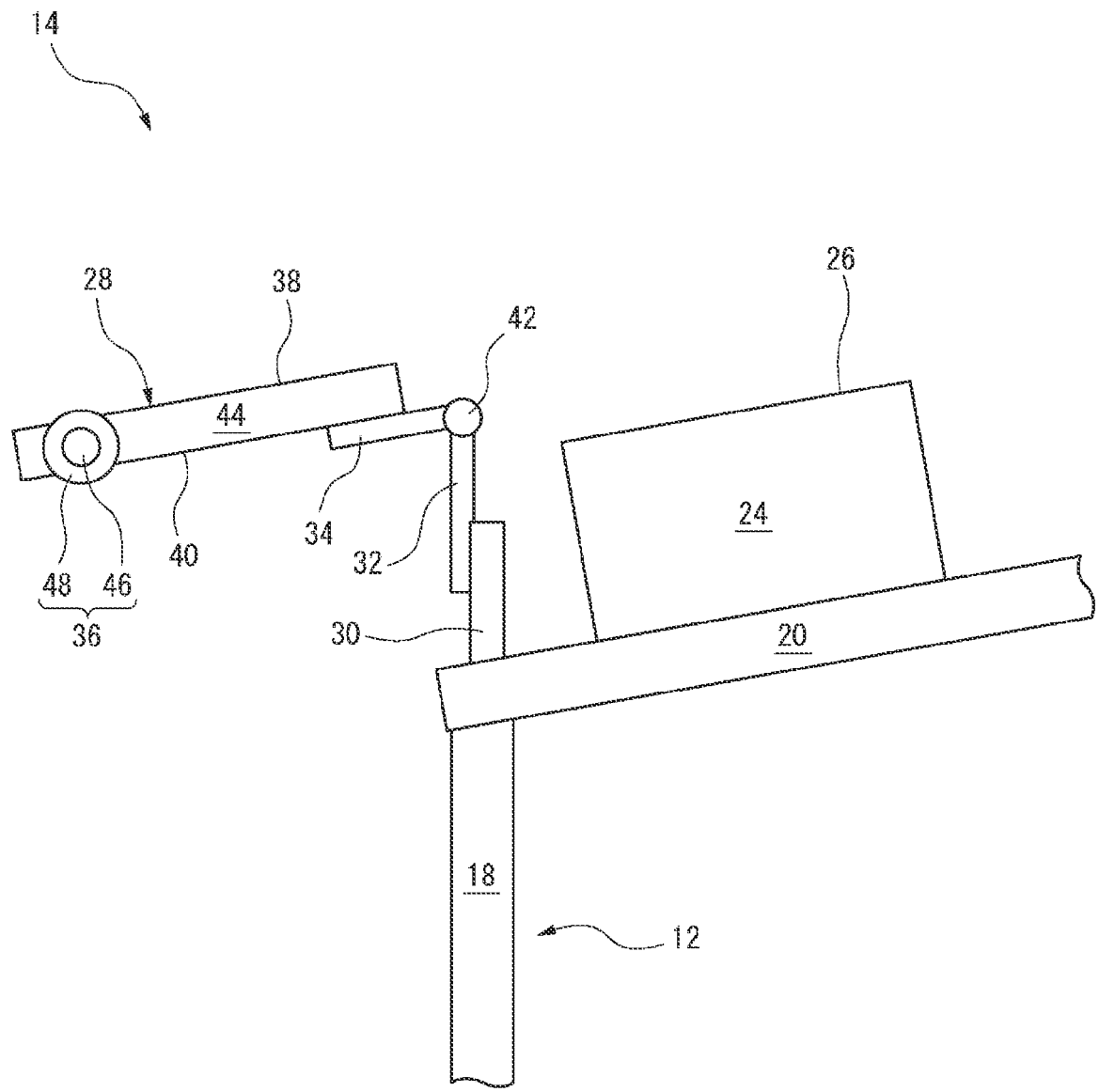
FIG. 5 is a diagram illustrating a state in which the lid mechanism illustrated in FIG. 3 has opened a lid.
Figure 5:
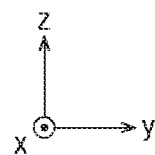

The lid 28 reciprocates between a closed position illustrated in FIG. 4 and an open position illustrated in FIG. 5 by a movement of the movable member 34 with respect to the fixed members 30 and 32. When the lid 28 is arranged at the closed position illustrated in FIG. 4, the lid 28 closes the opening 26 of the container 24, which is arranged at the set position SP of the container installation frame 20, by the first surface 38 of the lid 28. At this time, the first surface 38 may abut to the upper surface of the container 24. On the other hand, when the lid 28 is retracted from the closed position in FIG. 4 and is arranged at the open position illustrated in FIG. 5, the lid 28 protrudes rearward from the rear end of the storage rack 12 and opens the opening 26 of the container 24 to the outside.

The opening/closing operation of the lid 28 may be performed, for example, by an operator or a robot which will be described later. Specifically, when opening the lid 28 arranged at the closed position illustrated in FIG. 4, the operator or the robot first grips the gripping ring 48 of the rotary gripping section 36 and rotates the gripping ring 48 about the hinge shaft 42 counterclockwise when viewed from the right side.

Thus, the lid 28 is guided to move along an arc-shaped track about the hinge shaft 42, the trajectory being substantially parallel to the yz plane, by the rotational movement of the movable member 34 with respect to the fixed members 30 and 32, such that the lid 28 is retracted from the closed position and reaches the open position illustrated in FIG. 5. As a result, the opening 26 of the container 24 is opened to the outside and the operator or the robot can take out an article stored in the container 24 through the opening 26.

On the other hand, when closing the lid 28 arranged at the open position illustrated in FIG. 5, the operator or the robot grips the gripping ring 48 of the rotary gripping section 36 and rotates the gripping ring 48 about the hinge shaft 42 clockwise when viewed from the right side. Thus, the lid 28 is guided to move along the same arc-shaped track as when the lid is opened by the rotational movement of the movable member 34 with respect to the fixed members 30 and 32 and reaches the closed position illustrated in FIG. 4. As a result, the lid 28 closes the opening 26 and can prevent foreign matter (such as cutting liquid or dust) from entering the inside of the container 24 through the opening 26.

In the present embodiment, a lid 28 is provided at the storage rack 12 (specifically, on each container installation frame 20) which is a member separate from containers 24 such that the lid 28 can reciprocate between the closed position and the open position as described above. Thus, in a case where a plurality of containers 24 are sequentially arranged at the set position SP of the storage rack 12 for example, the containers 24 can be opened and closed by a simple operation using a common lid 28 because the lid 28 is provided at a separate member from the containers 24 (in other words, the lid 28 is independent of the containers 24). This can achieve both a reduction in the number of parts and a simplification of tasks.

In addition, in the present embodiment, the lid 28 is caused to reciprocate by a movement (specifically, a rotational movement) of the movable member 34 with respect to the fixed members 30 and 32. According to this configuration, the operation of opening and closing the opening 26 of the container 24 can be reproduced with high accuracy because the lid 28 can be guided to reciprocate along the same trajectory by a simple structure.

Further, in the present embodiment, the movable member 34 is rotatably provided at the fixed member 32 to guide the lid 28 such that the lid 28 reciprocates along the arc-shaped track by the rotational movement of the movable member 34 with respect to the fixed member 32. According to this configuration, the operator or the robot can easily open and close the lid 28 with a small force (specifically, a small torque).

Furthermore, in the present embodiment, the movable member 34 is fixed to one end of the lid 28, while the rotary gripping section 36 is provided at another end of the lid 28 opposite to the one end. Then, the gripping ring 48 of the rotary gripping section 36 relatively rotates about the gripping shaft 46 as the operator or the robot grips the gripping ring 48 of the rotary gripping section 36 to open or close the lid 28.

Thus, the operator or the robot can open and close the lid 28 by operating the rotary gripping section 36 while gripping the gripping ring 48. In addition, the operator or the robot can easily open and close the lid 28 with a small force (specifically, a small torque) because the rotary gripping section 36 is provided separated from the movable member 34 at an end of the lid 28 opposite to the movable member 34.

Without being limited to the above lid mechanisms 14, various forms of lid mechanisms can be applied to the article storage apparatus 10. Hereinafter, a lid mechanism 50 according to another embodiment will be described with reference to FIGS. 6 to 8. The lid mechanism 50 includes a lid 28, fixed members 30, 52 and 54, a movable member 34, a rotary gripping section 36, and an elastic member 60. The fixed member 52 is a member having a substantially L-shape when viewed from the x-axis direction and includes a first arm 56 and a second arm 58. The first arm 56 is a flat plate-like member and is fixed to the fixed member 30, for example, by a fastener such as a bolt or welding and the like and extends upward from an upper end of the fixed member 30.

The second arm 58 is a flat plate-like member, which is integrally formed at an upper end of the first arm 56 such that it is substantially orthogonal to the first arm 56, and extends rearward from the upper end of the first arm 56. The fixed member 54 is fixed to an upper surface of the second arm 58, for example, by a fastener such as a bolt or welding and the like. In this way, the fixed members 52 and 54 are fixed to the container installation frame 20 via the fixed member 30.

The movable member 34 is rotatably provided at the fixed member 54 via a hinge shaft 42. The fixed member 54, the movable member 34, and the hinge shaft 42 constitute one hinge. In the present embodiment, the elastic member 60 is provided on an upper surface of the fixed member 54. The elastic member 60 is made of an elastic material such as a rubber material, a urethane material, or an elastic resin material.

Figure 6:
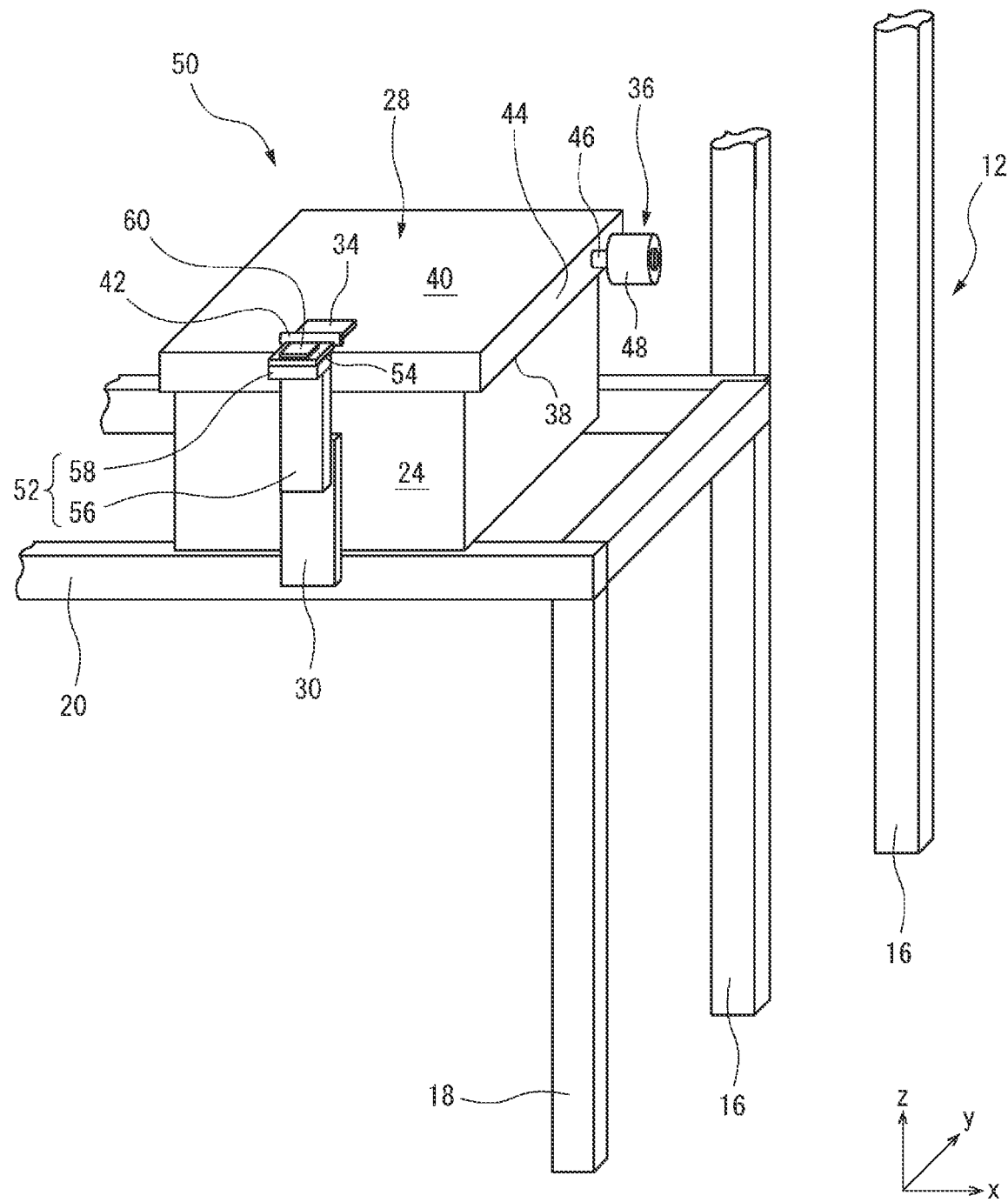
FIG. 6 is an enlarged perspective view of a lid mechanism according to another embodiment.
Figure 7:
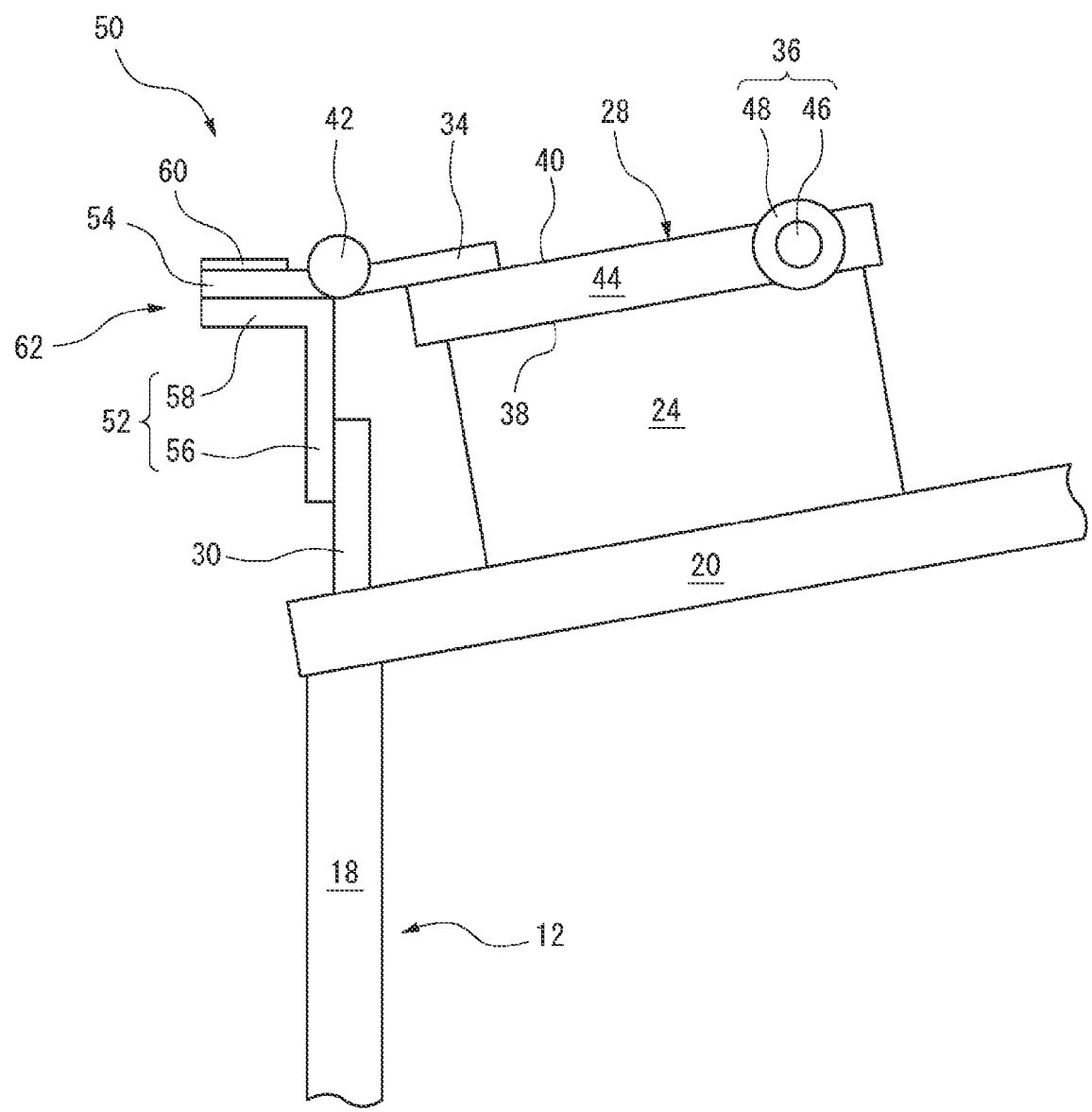
FIG. 7 is a side view of the lid mechanism illustrated in FIG. 6.
Figure 8:
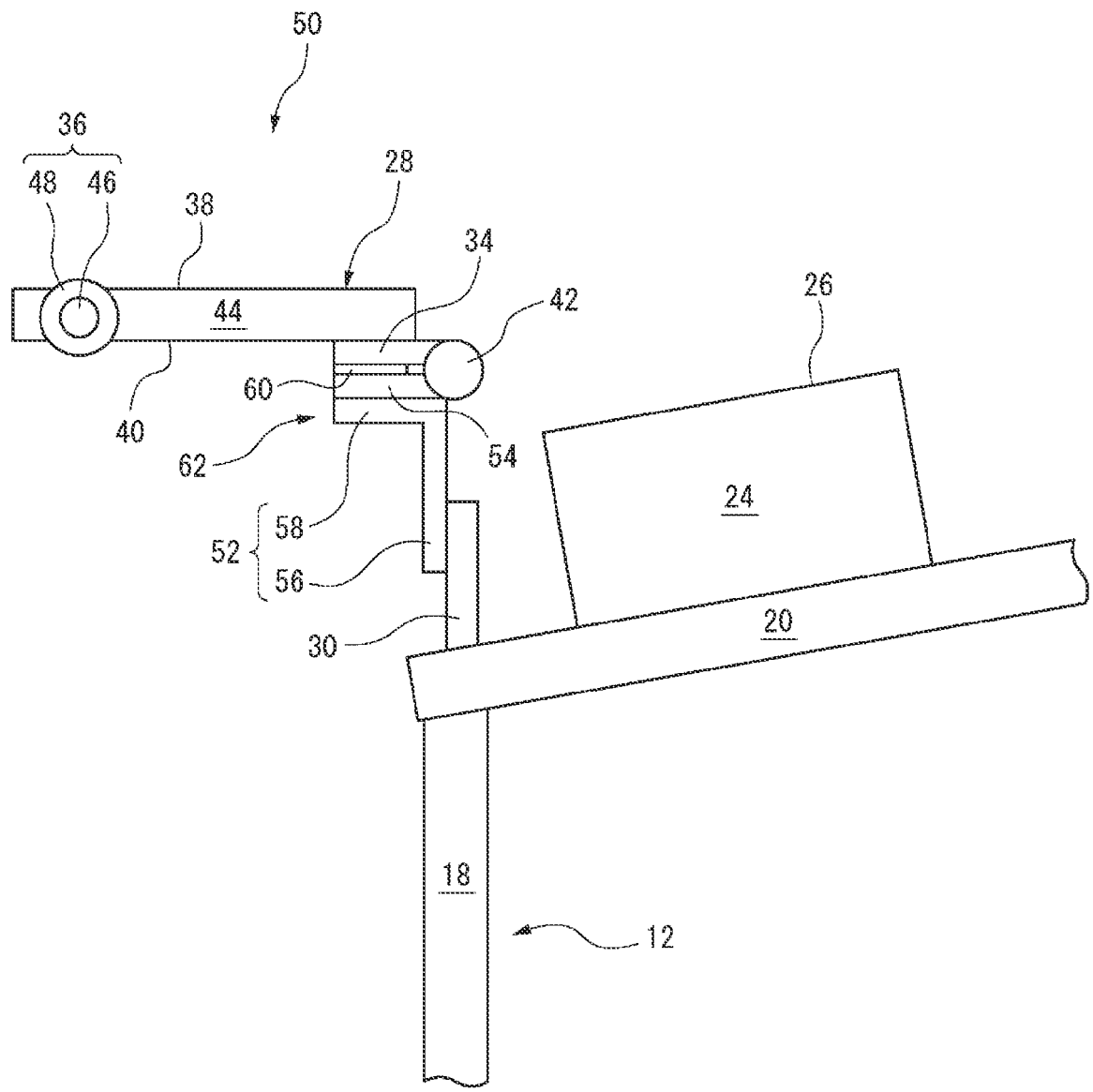
FIG. 8 is a diagram illustrating a state in which the lid mechanism illustrated in FIG. 7 has opened a lid.

When the lid 28 is opened from a closed position illustrated in FIGS. 6 and 7 to an open position illustrated in FIG. 8, the fixed member 54 and the movable member 34 are arranged such that they face each other in the z-axis direction and the elastic member 60 is interposed between the fixed member 54 and the movable member 34. At this time, the assembly of the lid 28 and the movable member 34 is supported by the second arm 58 of the fixed member 52 and the fixed member 54, whereby further rotation of the lid 28 is restricted and the lid 28 is held at the open position. Thus, the second arm 58 of the fixed member 52 and the fixed member 54 constitute a movement restricting mechanism 62 that, when the lid 28 is arranged at the open position, restricts movement of the lid 28 and holds the lid 28 at the open position.

In addition, the second arm 58 and the fixed member 54 restrict rotation of the lid 28 by engaging with the assembly of the lid 28 and the movable member 34 via the elastic member 60. Thus, the second arm 58 and the fixed member 54 function as an engaging portion that engages with the lid 28 arranged at the open position and restricts movement of the lid 28. In the present embodiment, the movement restricting mechanism 62 is configured to hold the lid 28 parallel to the horizontal plane when the lid 28 is arranged at the open position.

In the present embodiment, when the lid 28 is arranged at the open position illustrated in FIG. 8, the elastic member 60 is interposed between the fixed member 54 and the movable member 34 as described above. According to this configuration, when the lid 28 is opened, the elastic member 60 reduces the impact between the fixed member 54 and the movable member 34 and thus can prevent failure of the components (e.g., the hinge consisting of the fixed member 54, the movable member 34, and the hinge shaft 42) of the article storage apparatus 10.

In addition, in the present embodiment, the article storage apparatus 10 includes the movement restricting mechanism 62 (specifically, the second arm 58 and the fixed member 54) that, when the lid 28 is arranged at the open position, restricts movement of the lid 28 and holds the lid 28 at the open position. According to this configuration, the lid 28 can be stably held at the open position.

Further, in the present embodiment, the movement restricting mechanism 62 is configured to hold the lid 28 arranged at the open position parallel to the horizontal plane. According to this configuration, for example, when the robot took out an article from the container 24 and placed it on the first surface 38 which faces vertically upward when the lid 28 is arranged at the open position as will be described later, the article can be placed stationary on the first surface 38. The second arm 58 of the fixed member 52 may also be provided such that it extends forward from the upper end of the first arm 56.

Next, a lid mechanism 70 according to another embodiment will be described with reference to FIGS. 9 and 10. The lid mechanism 70 includes a lid 28, fixed members 30, 72, and 54, a movable member 34, a rotary gripping section 36, an elastic member 60, and a stopper hinge mechanism 74. The fixed member 72 includes a first arm 76 and a second arm 78.

The first arm 76 is a flat plate-like member fixed to the fixed member 30, for example, by a fastener such as a bolt or welding and the like and extends upward from the fixed member 30. The second arm 78 is a flat plate-like member, which is integrally formed at an upper end of the first arm 76 such that it is inclined with respect to the first arm 76, and extends rearward from the upper end of the first arm 76. A fixed member 54 is fixed to an upper surface of the second arm 78.

The stopper hinge mechanism 74 includes a hinge shaft 42 and an angle adjusting mechanism 80. The movable member 34 is rotatably provided at the fixed member 54 via the hinge shaft 42 of the stopper hinge mechanism 74. The angle adjusting mechanism 80 adjusts the rotation angle θ (opening angle) of the movable member 34 with respect to the fixed member 54. Specifically, the angle adjusting mechanism 80 includes, for example, a gear or a locking mechanism and holds the movable member 34 at a position of a rotation angle θ arbitrarily set in the angle adjusting mechanism 80 with respect to the fixed member 54.

Figure 9:
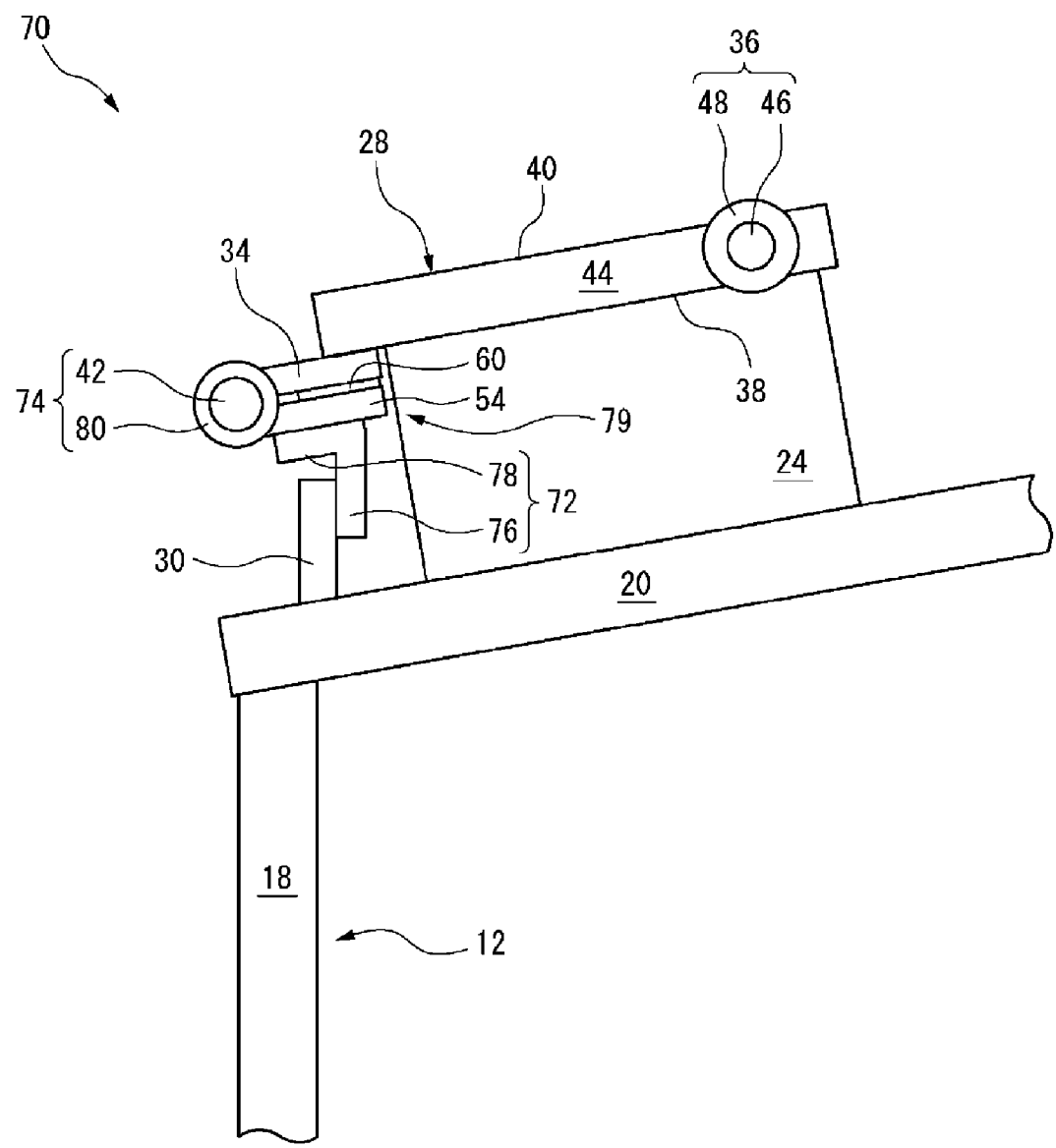
FIG. 9 is a side view of a lid mechanism according to another embodiment.
Figure 9:
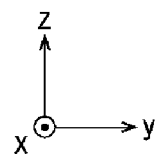

When the lid 28 is arranged at a closed position as illustrated in FIG. 9, the fixed member 54 and the movable member 34 are arranged such that they face each other and the elastic member 60 is interposed between the fixed member 54 and the movable member 34. At this time, the assembly of the lid 28 and the movable member 34 is supported by the second arm 78 of the fixed member 72 and the fixed member 54, whereby further rotation of the lid 28 is restricted and the lid 28 is held at the closed position.

That is, in the present embodiment, the open position where the lid 28 closes the opening 26 is defined by the second arm 78 and the fixed member 54. In the present embodiment, the second arm 78 and the fixed member 54 constitute a movement restricting mechanism 79 that, when the lid 28 is arranged at the closed position, restricts movement of the lid 28 and holds the lid 28 at the closed position as described above.

In addition, the second arm 78 and the fixed member 54 restrict rotation of the lid 28 by engaging with the assembly of the lid 28 and the movable member 34 via the elastic member 60. Thus, the second arm 78 and the fixed member 54 function as an engaging portion that engages with the lid 28 arranged at the closed position and restricts movement of the lid 28.

Figure 10:
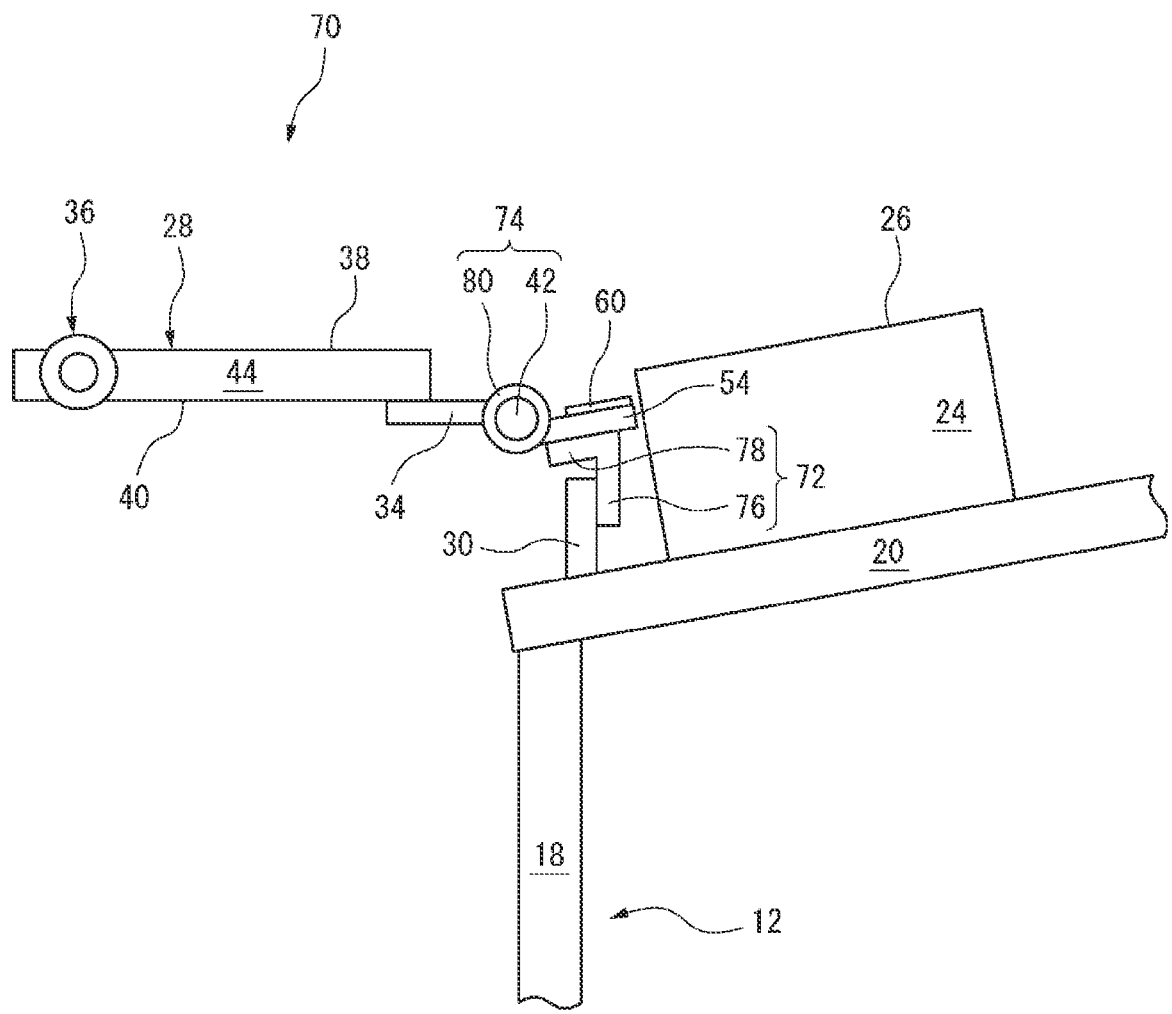
FIG. 10 is a diagram illustrating a state in which the lid mechanism illustrated in FIG. 9 has opened a lid.

On the other hand, when the lid 28 is rotated and opened along an arc-shaped track about the hinge shaft 42 from the closed position illustrated in FIG. 9 to an open position illustrated in FIG. 10 and the movable member 34 reaches the position of the rotation angle θ set in the angle adjusting mechanism 80 with respect to the fixed member 54, the rotational movement of the movable member 34 and the lid 28 is restricted by the angle adjusting mechanism 80, whereby the lid 28 is held at the open position.

In other words, in the present embodiment, the open position of the lid 28 is defined by the rotation angle θ se in the angle adjusting mechanism 80. Thus, the angle adjusting mechanism 80 constitutes a movement restricting mechanism 80 that, when the lid 28 is arranged at the open position, restricts movement of the lid 28 and holds the lid 28 at the open position.

Here, in the present embodiment, the rotation angle θ of the angle adjusting mechanism 80 is set such that it holds the lid 28 arranged at the open position parallel to the horizontal plane. According to this configuration, the angle adjusting mechanism (movement restricting mechanism) 80 can stably hold the lid 28 arranged at the open position parallel to the horizontal plane.

Figure 11:
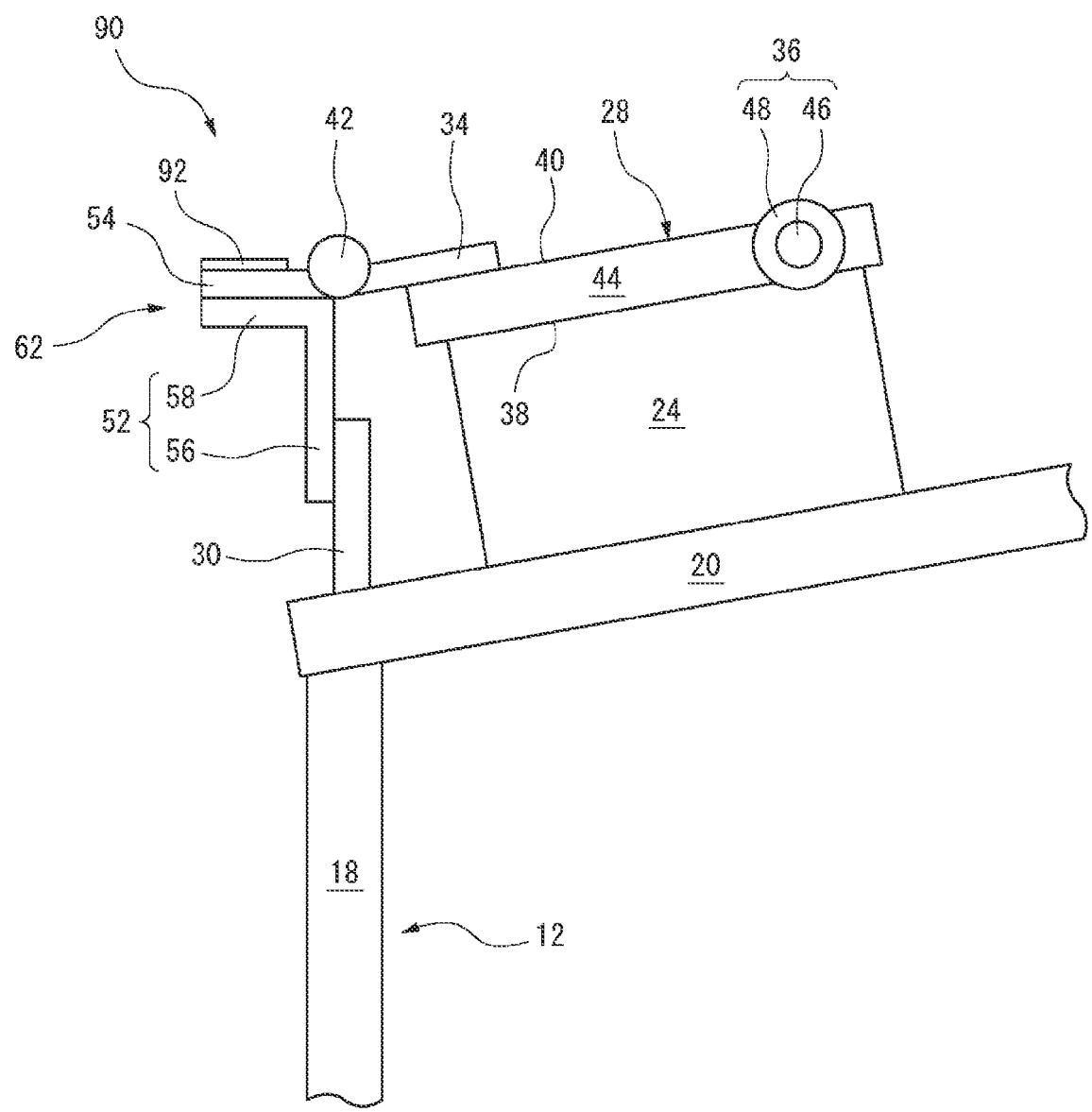
FIG. 11 is a side view of a lid mechanism according to another embodiment.
Figure 11:
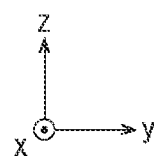

Next, a lid mechanism 90 according to another embodiment will be described with reference to FIGS. 11 and 12. The lid mechanism 90 differs from the lid mechanism 50 illustrated in FIGS. 6 to 8 in the following configuration. That is, the lid mechanism 90 includes a mass sensor 92 instead of the elastic member 60. The mass sensor 92 includes, for example, a piezoelectric element, a strain gauge, a weight sensor, a pressure sensor, or the like and is provided on the upper surface of the fixed member 54.

Figure 12:
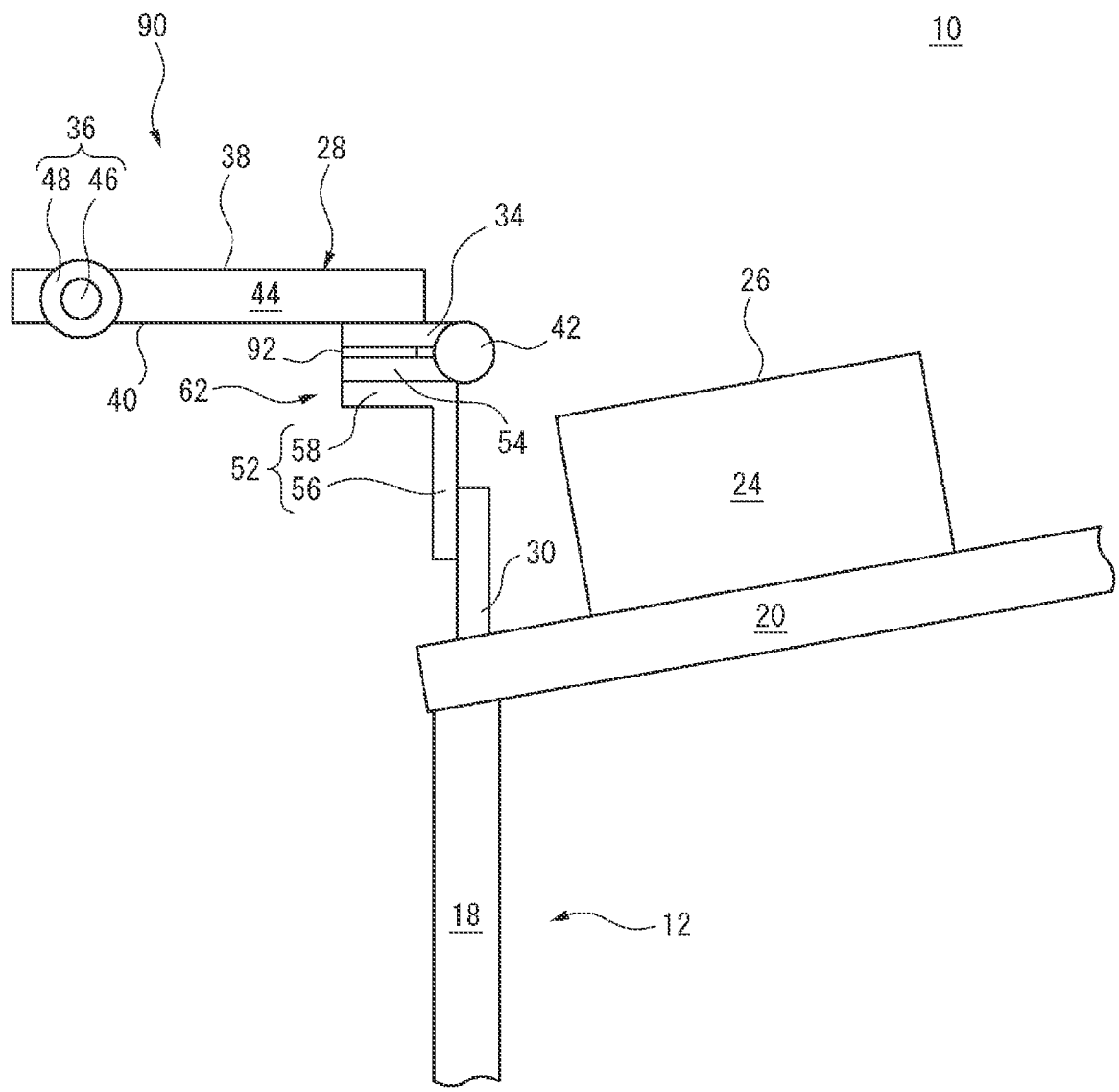
FIG. 12 is a diagram illustrating a state in which the lid mechanism illustrated in FIG. 11 has opened a lid.

When the lid 28 is arranged at an open position illustrated in FIG. 12, the mass sensor 92 is interposed between the fixed member 54 and the movable member 34 which are arranged such that they face each other. In this state, for example, when the robot took out an article from the container 24 and placed it on the lid 28 arranged at the open position as will be described later, the weight of the lid 28 and the article placed on the lid 28 is applied to the mass sensor 92. The mass sensor 92 can detect the mass of the lid 28 and the article placed on the lid 28.

Next, a lid mechanism 100 according to another embodiment will be described with reference to FIGS. 13 to 15. The lid mechanism 100 includes a lid 28, fixed members 30 and 32, a movable member 34, a rotary gripping section 36, and a movement restricting mechanism 102. The movement restricting mechanism 102 includes a first engaging portion 104 and a second engaging portion 106.

Each of the first engaging portion 104 and the second engaging portion 106 is fixed to the second surface 40 of the lid 28 and protrudes from the second surface 40. The first engaging portion 104 and the second engaging portion 106 may be provided integrally with the lid 28 or may be provided separately from the lid 28 and attached to the second surface 40.

On the other hand, a first abutting portion 108 and a second abutting portion 109 are fixedly attached to the container installation frame 20 of the storage rack 12. Each of the first abutting portion 108 and the second abutting portion 109 extends upward from the main body of the container installation frame 20. The first abutting portion 108 and the second abutting portion 109 may be provided integrally with the main body of the container installation frame 20 or may be provided separately from the main body of the container installation frame 20 and attached to the main body.

Figure 13:
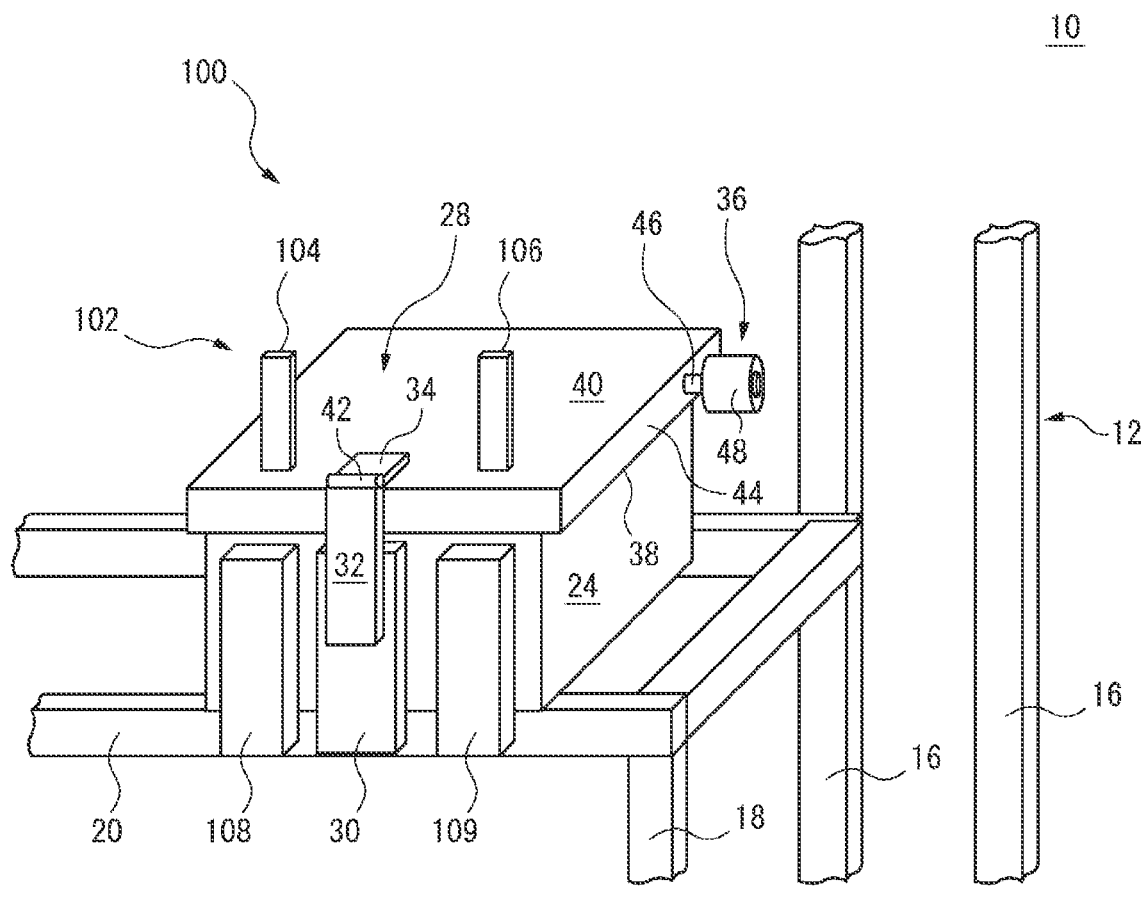
FIG. 13 is an enlarged perspective view of a lid mechanism according to another embodiment.
Figure 14:
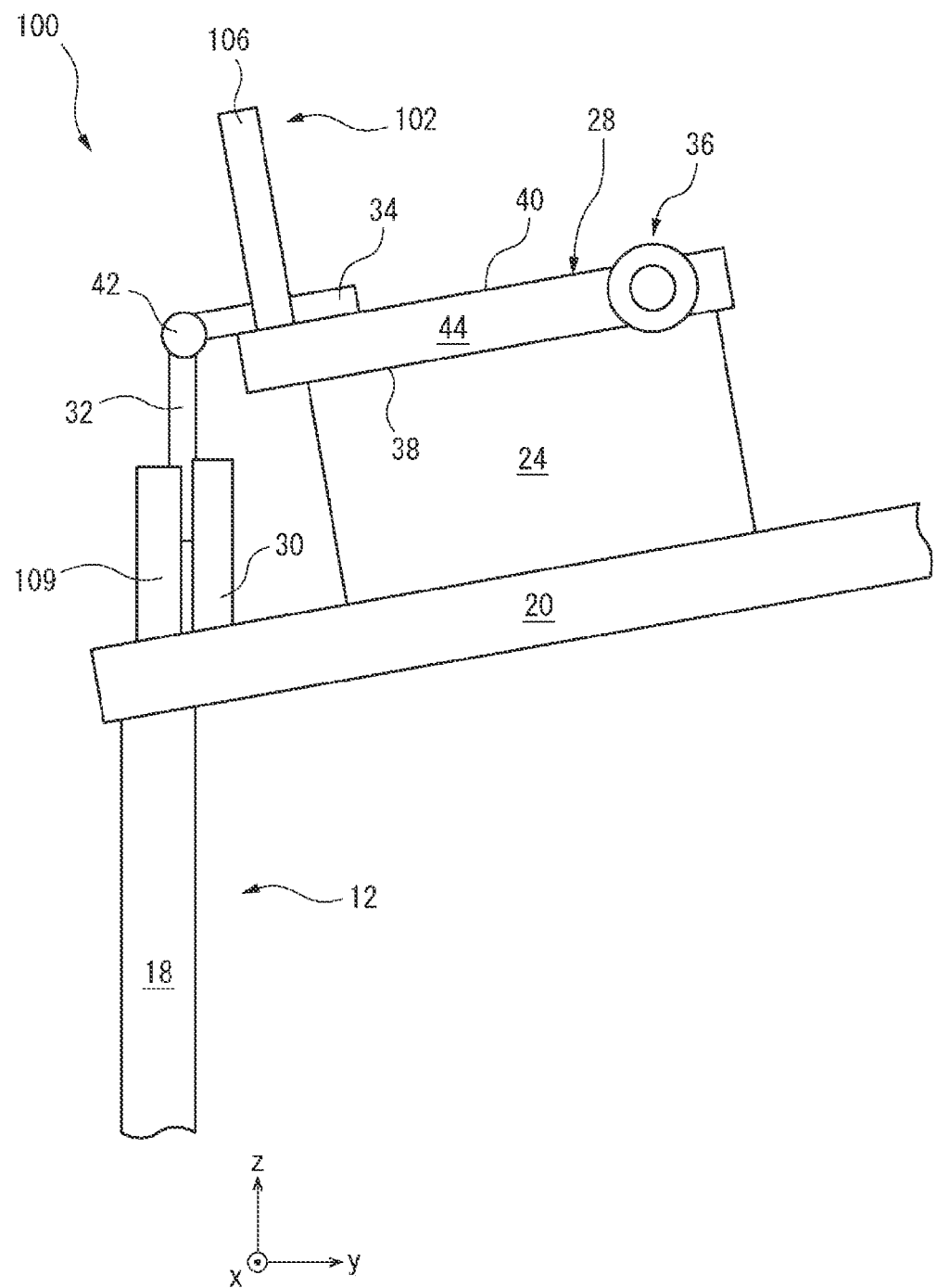
FIG. 14 is a side view of the lid mechanism illustrated in FIG. 13.
Figure 15:
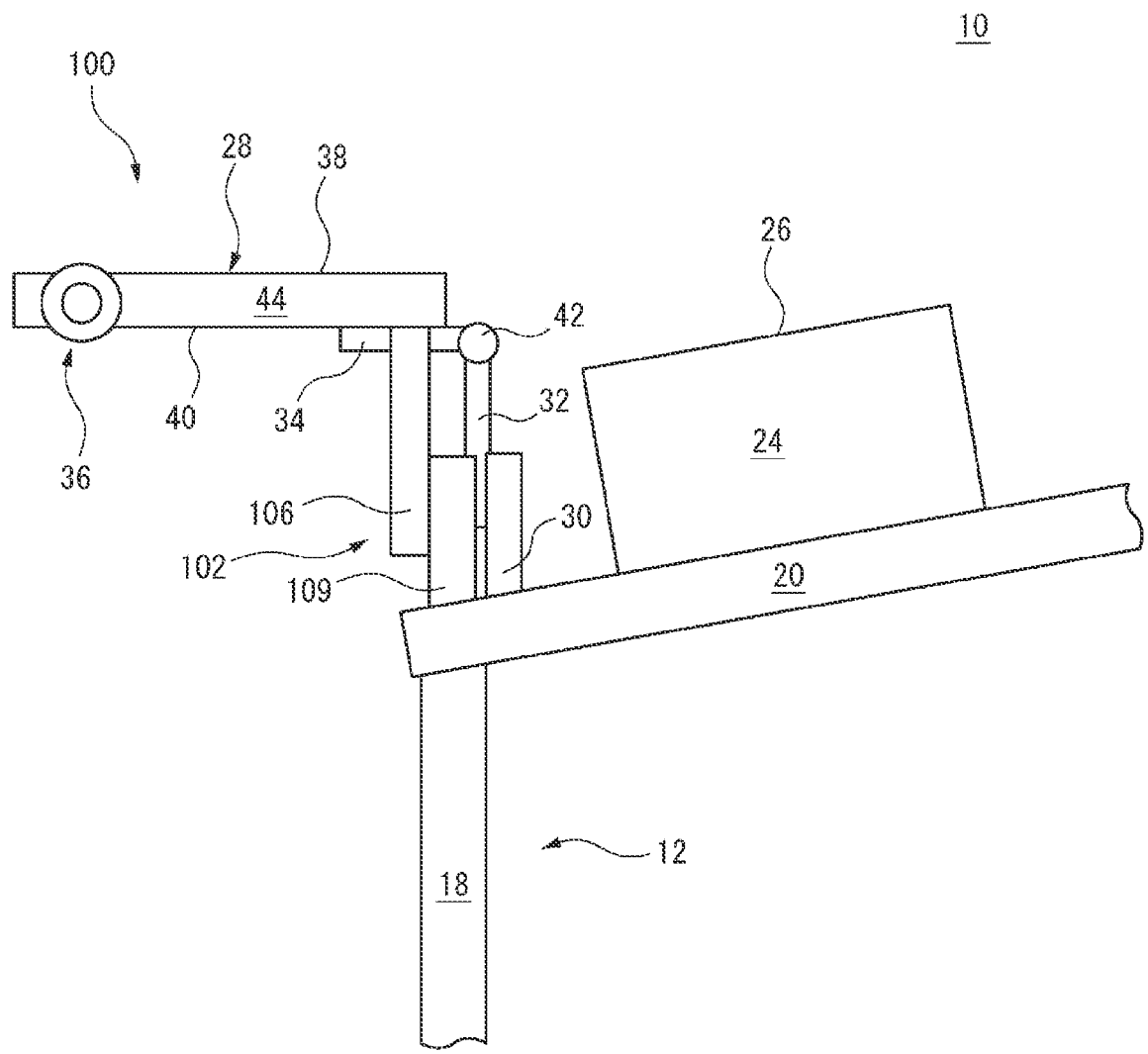
FIG. 15 is a diagram illustrating a state in which the lid mechanism illustrated in FIG. 14 has opened a lid.

When the lid 28 is rotated and opened along an arc-shaped track about the hinge shaft 42 from a closed position illustrated in FIGS. 13 and 14 to an open position illustrated in FIG. 15, the first engaging portion 104 and the second engaging portion 106 engage with the first abutting portion 108 and the second abutting portion 109 of the container installation frame 20, respectively, thereby restricting further rotation of the lid 28.

In this way, the movement restricting mechanism 102 holds the lid 28 at the open position. In the present embodiment, the movement restricting mechanism 102 is configured to hold the lid 28 parallel to the horizontal plane when the lid 28 is arranged at the open position. According to the present embodiment, the movement restricting mechanism 102 can stably hold the lid 28 at the open position.

In the present embodiment, the movement restricting mechanism can also be provided at the storage rack 12. For example, the movement restricting mechanism may include a base arm which is fixed to the container installation frame 20 such that it extends rearward from the container installation frame 20 and an engaging portion which extends upward from the base arm. In this case, when the lid 28 is arranged at the open position, the engaging portion engages with the lid 28 at its upper end and holds the lid 28 at the open position, for example, parallel to the horizontal plane.

Next, a lid mechanism 110 according to another embodiment will be described with reference to FIG. 16. The lid mechanism 110 differs from the lid mechanism 100 described above in a movement restricting mechanism 112. The movement restricting mechanism 112 includes an engaging portion 116 at its tip end while its base end 114 is fixed to the second surface 40 of the lid 28. The movement restricting mechanism 112 extends from the second surface 40 along an axis line A. This axis line A may be substantially orthogonal to the second surface 40.

On the other hand, an abutting portion 118 is fixedly attached to the container installation frame 20 of the storage rack 12. The abutting portion 118 extends rearward from the main body of the container installation frame 20. When the lid 28 is arranged at the open position as illustrated in FIG. 16, the engaging portion 116 of the movement restricting mechanism 112 engages with the abutting portion 118 of the container installation frame 20, thereby restricting further rotation of the lid 28. In this way, the movement restricting mechanism 112 holds the lid 28 at the open position.

Here, in the present embodiment, the movement restricting mechanism 112 is configured such that its length L in the direction of the axis line A from its base end 114 to the engaging portion 116 located at its tip end is variable (in other words, stretchable along the axis line A). The movement restricting mechanism 112 includes, for example, a telescope mechanism or a mechanism that includes a rail portion and a slider portion slidable on the rail portion. The movement restricting mechanism 112 may further include a locking mechanism that locks the engaging portion 116 with respect to the base end 114 at an arbitrary length L.

Figure 16:
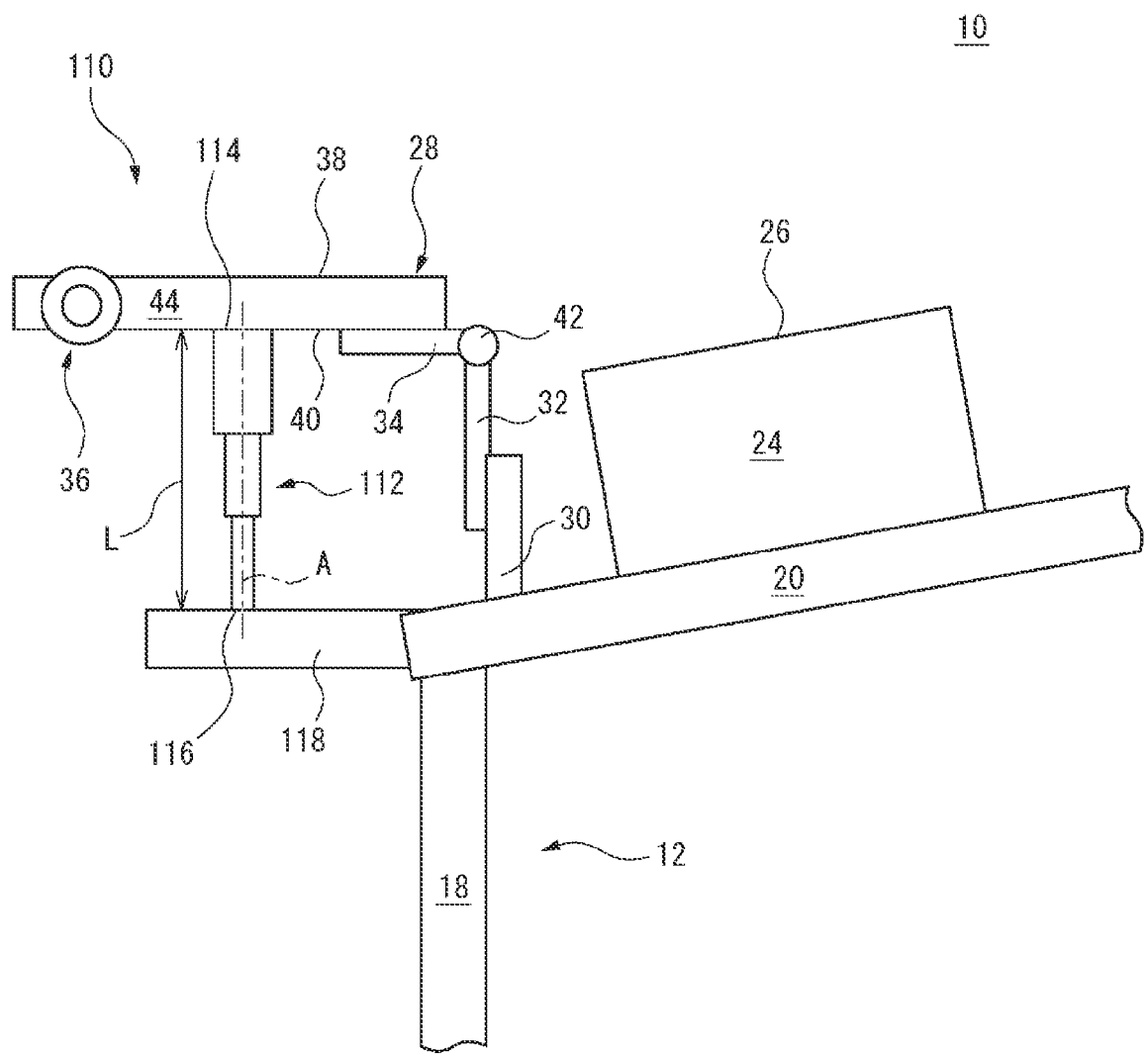
FIG. 16 is a side view of a lid mechanism according to another embodiment.

The operator can arbitrarily adjust the inclination angle of the lid 28 arranged at the open position with respect to the horizontal plane by adjusting the length L of the movement restricting mechanism 112 in the state illustrated in FIG. 16. As a result, the operator can adjust the inclination angle of the lid 28 at the open position such that it is parallel to the horizontal plane with high accuracy.

The movement restricting mechanism 112 may also be provided at the storage rack 12. For example, the movement restricting mechanism 112 may be provided on the abutting portion 118 such that its base end is fixed to an upper surface of the abutting portion 118 and its engaging portion 116 is arranged above the base end. That is, in this case, the engaging portion 116 of the movement restricting mechanism 112 is provided on the abutting portion 118 of the container installation frame 20, and when the lid 28 is arranged at the open position, engages with the lid 28 to restrict movement of the lid 28.

Next, a lid mechanism 120 according to another embodiment will be described with reference to FIGS. 17 to 20. The lid mechanism 120 differs from the lid mechanism 100 illustrated in FIGS. 13 to 15 in a lid 122. The lid 122 includes a main body 124 and an open and close door mechanism 126. The main body 124 is a flat plate member including a first surface 38 and a second surface 40 and a through hole 128 (FIG. 18) is formed in a central portion thereof.

The open and close door mechanism 126 includes a pair of doors 130 and 132 and a door engaging portion 134. A base end of the door 130 is rotatably provided at the main body 124 via a hinge shaft 136 provided at the rear side of the through hole 128, while a tip end 130a thereof is a free end. On the other hand, a base end of the door 132 is rotatably provided at the main body 124 via a hinge shaft 138 provided at the front side of the through hole 128, while a tip end 132a thereof is a free end. The hinge shafts 136 and 138 extend parallel to the x-axis direction.

The door engaging portion 134 includes a first arm 140 and a second arm 142. The first arm 140 is a flat plate-like member with a base end fixed to the second surface 40 of the main body 124 and extends from the second surface 40. The second arm 142 is a flat plate-like member that is integrally formed at the tip end of the first arm 140 such that it is substantially orthogonal to the first arm 140 and extends to the right from the tip end of the first arm 140.

Figure 17:
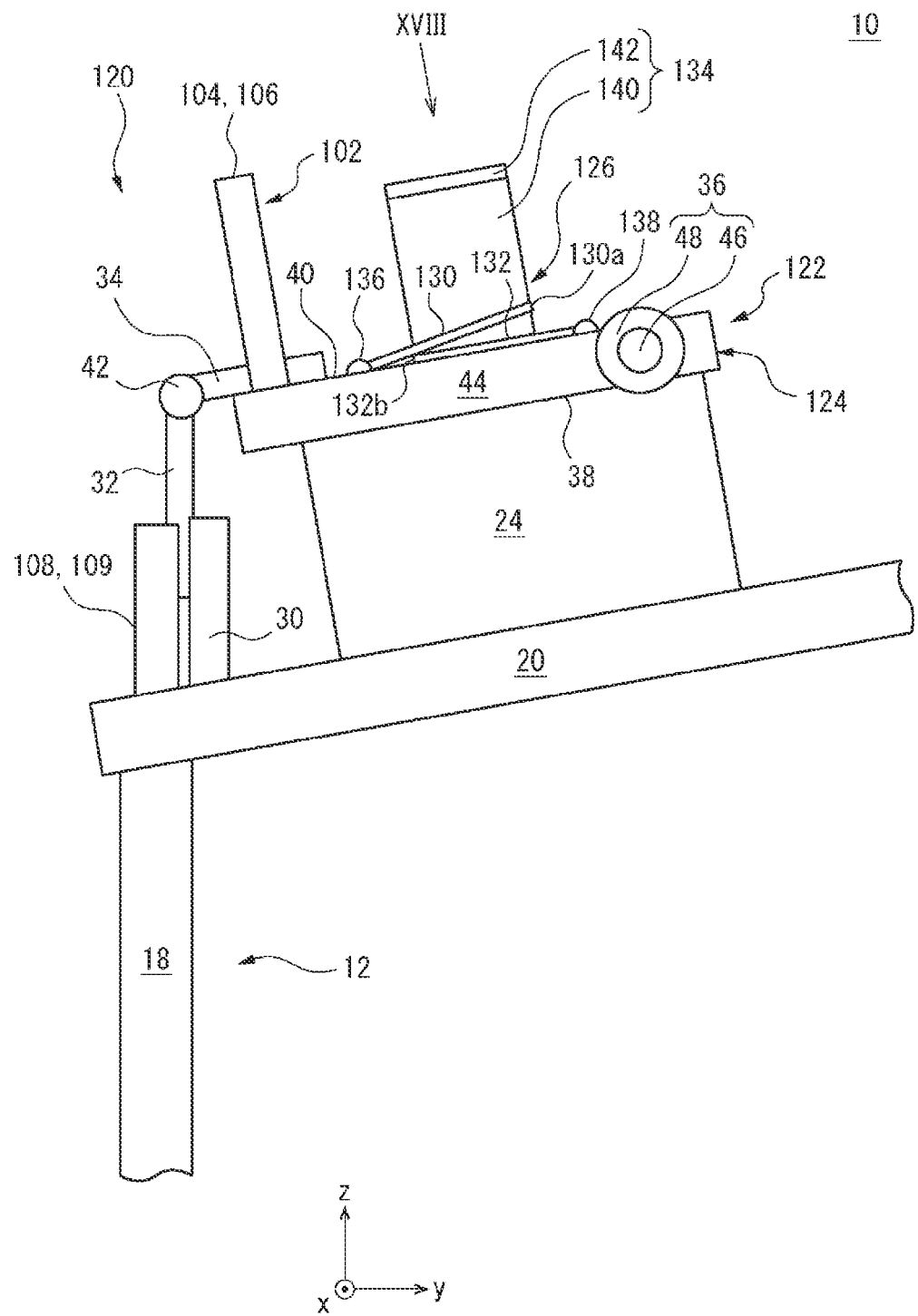
FIG. 17 is a side view of a lid mechanism according to another embodiment.
Figure 18:
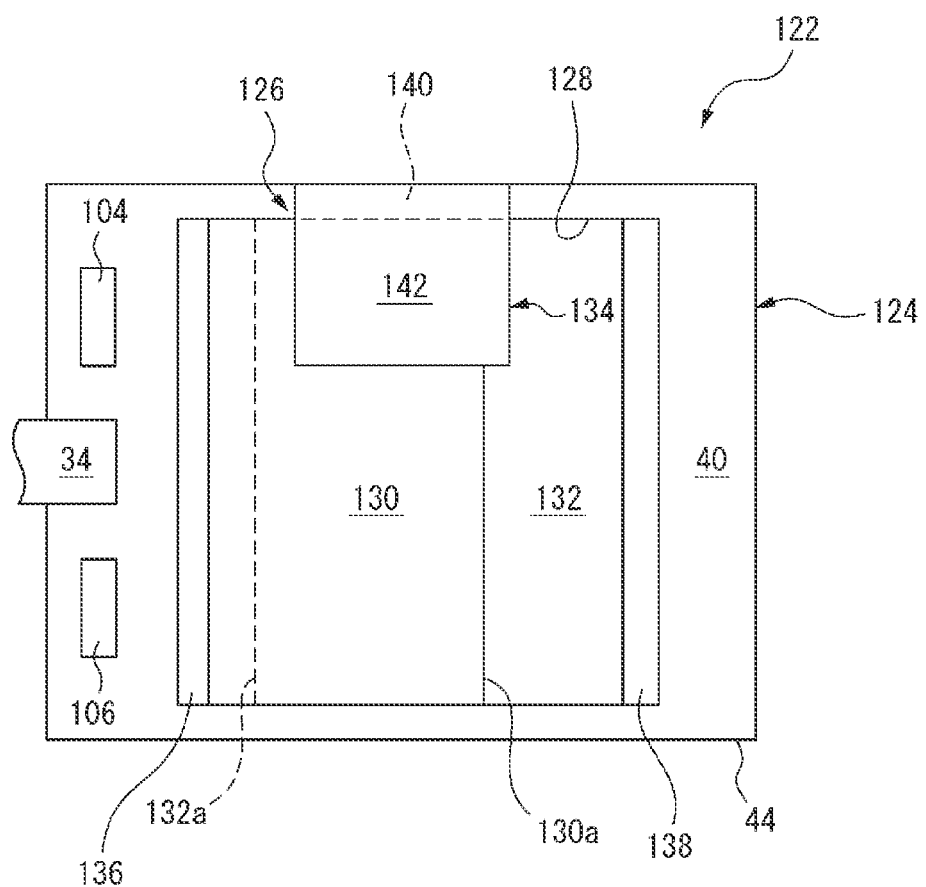
FIG. 18 is a view of the lid mechanism illustrated in FIG. 17 as viewed from arrow XVIII in FIG. 17.

When the lid 122 is arranged at a closed position illustrated in FIG. 17, the door 130 overlaps the door 132 and the pair of doors 130 and 132 is closed. As a result, the opening 26 of the container 24 is closed by the lid 122 (specifically, the main body 124 and the pair of doors 130 and 132).

Figure 19:
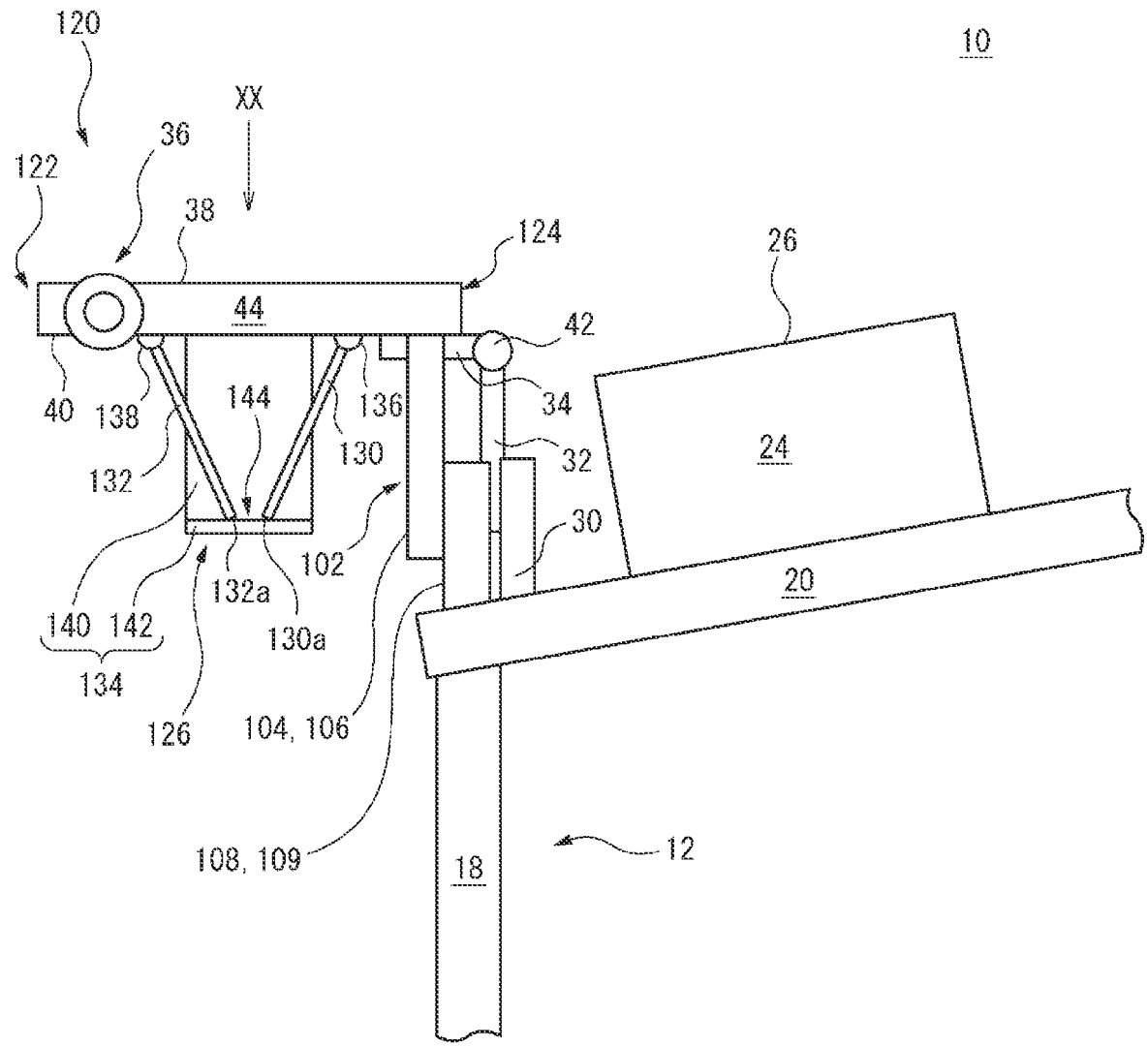
FIG. 19 is a diagram illustrating a state in which the lid mechanism illustrated in FIG. 17 has opened a lid.
Figure 20:
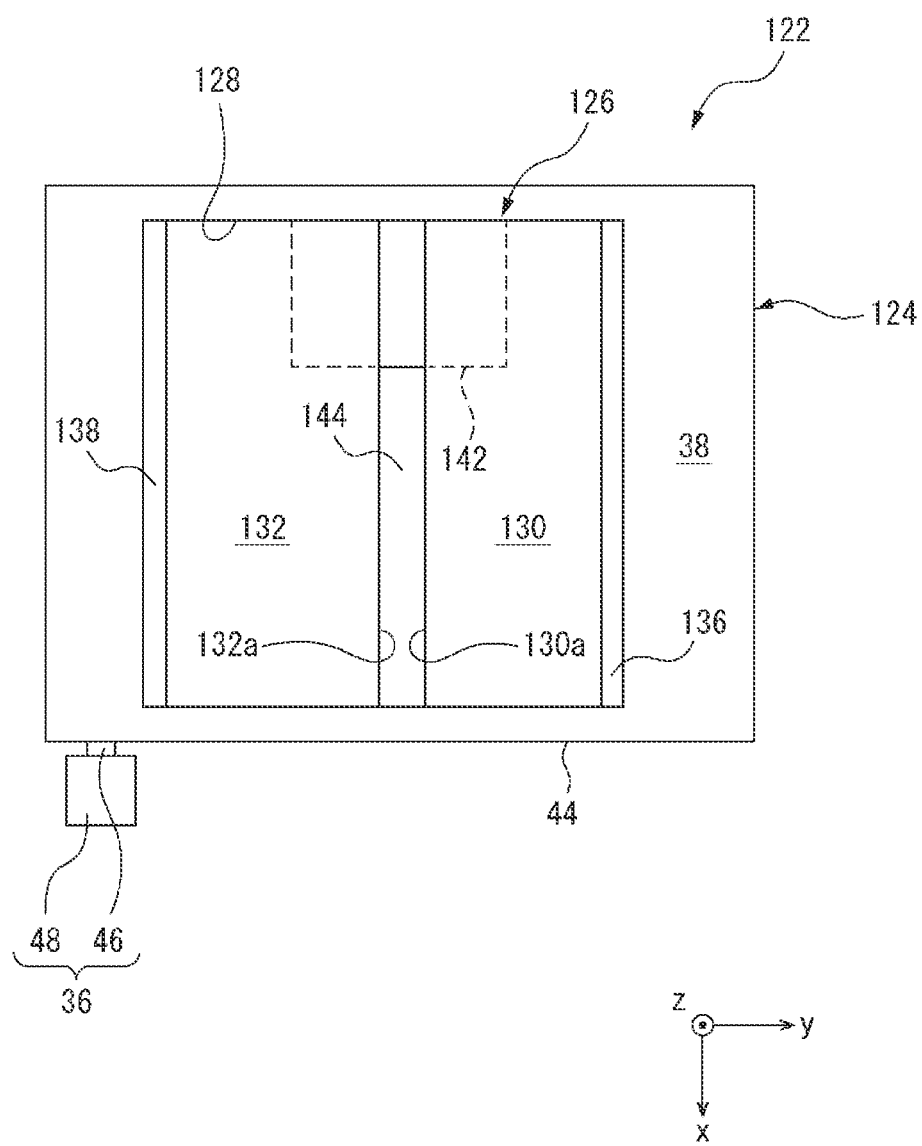
FIG. 20 is a view of the lid mechanism illustrated in FIG. 19 as viewed from arrow XX in FIG. 19.

On the other hand, when the lid 122 is rotated about the hinge shaft 42 from the closed position illustrated in FIG. 17 to an open position illustrated in FIG. 19, a first engaging portion 104 and a second engaging portion 106 of a movement restricting mechanism 102 engage with a first abutting portion 108 and a second abutting portion 109 of the storage rack 12, respectively, whereby rotation of the lid 122 is restricted and the lid 122 is arranged at the open position.

When the lid 122 is arranged at the open position, the doors 130 and 132 rotate about the hinge shafts 136 and 138, respectively, due to the action of gravity and the tip end 130a of the door 130 and the tip end 132a of the door 132 engage with the second arm 142 of the door engaging portion 134. In this way, the pair of doors 130 and 132 expands vertically downward and is opened and a lid opening 144 is formed between the tip end 130a of the door 130 and the tip end 132a of the door 132.

When the lid 122 is rearranged at the closed position, the pair of doors 130 and 132 overlap each other and the lid opening 144 is closed as illustrated in FIG. 17. In this way, the open and close door mechanism 126 expands vertically downward to form the lid opening 144 when the lid 122 is arranged at the open position, while the lid opening 144 is closed when the lid 122 is arranged at the closed position.

Figure 21:
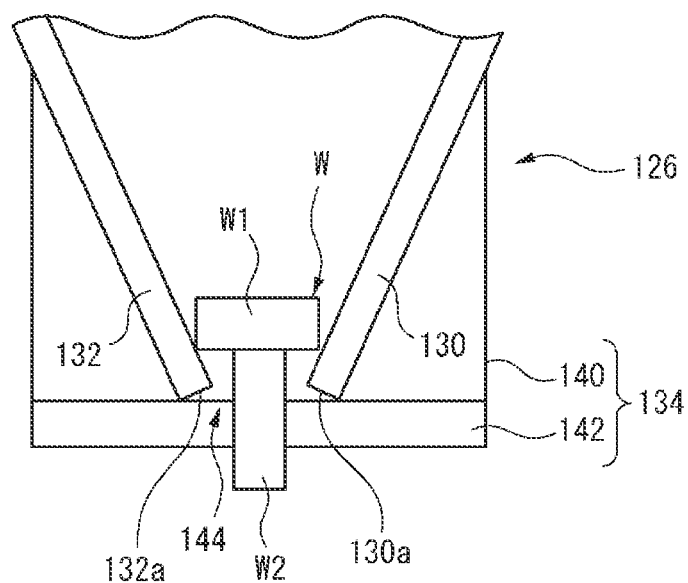
FIG. 21 is a diagram for explaining a function of an orientation adjusting mechanism illustrated in FIG. 19.
Figure 21:
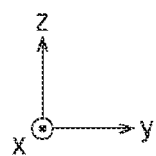

The open and close door mechanism 126 can adjust the orientation of an article put into the through hole 128 when the lid 122 is arranged at the open position. This function will be described with reference to FIG. 21. In an example illustrated in FIG. 21, an article W is, for example, a bolt or a connecting rod and includes a head W1 and a shaft W2 extending from the head W1.

When the article W is put into the through hole 128 of the lid 122 arranged at the open position from above, the head W1 is locked to the doors 130 and 132, while the shaft W2 is received by the lid opening 144. As a result, the orientation of the article W is adjusted such that the head W1 is arranged vertically above and the shaft W2 hangs vertically downward from the head W1. In the present embodiment, the open and close door mechanism 126 functions as an orientation adjusting mechanism that adjusts the orientation of an article W placed on the lid 122 arranged at the open position as described above.

Next, a lid mechanism 150 according to another embodiment will be described with reference to FIGS. 22 and 23. The lid mechanism 150 differs from the lid mechanism 120 described above in a lid 152. Specifically, the lid 152 includes a main body 124 and an open and close door mechanism 154. The open and close door mechanism 154 includes a tubular portion 156 and a door 158.

In the present embodiment, the tubular portion 156 is, for example, a bellows-like flexible member and is configured to be stretchable in the direction of its central axis. The tubular portion 156 is arranged such that its base end surrounds the periphery of the through hole 128 (FIG. 18) of the main body 124 and a lid opening 162 is defined at its tip end. The door 158 is rotatably provided at the tip end of the tubular portion 156 via a hinge shaft 160.

Figure 22:
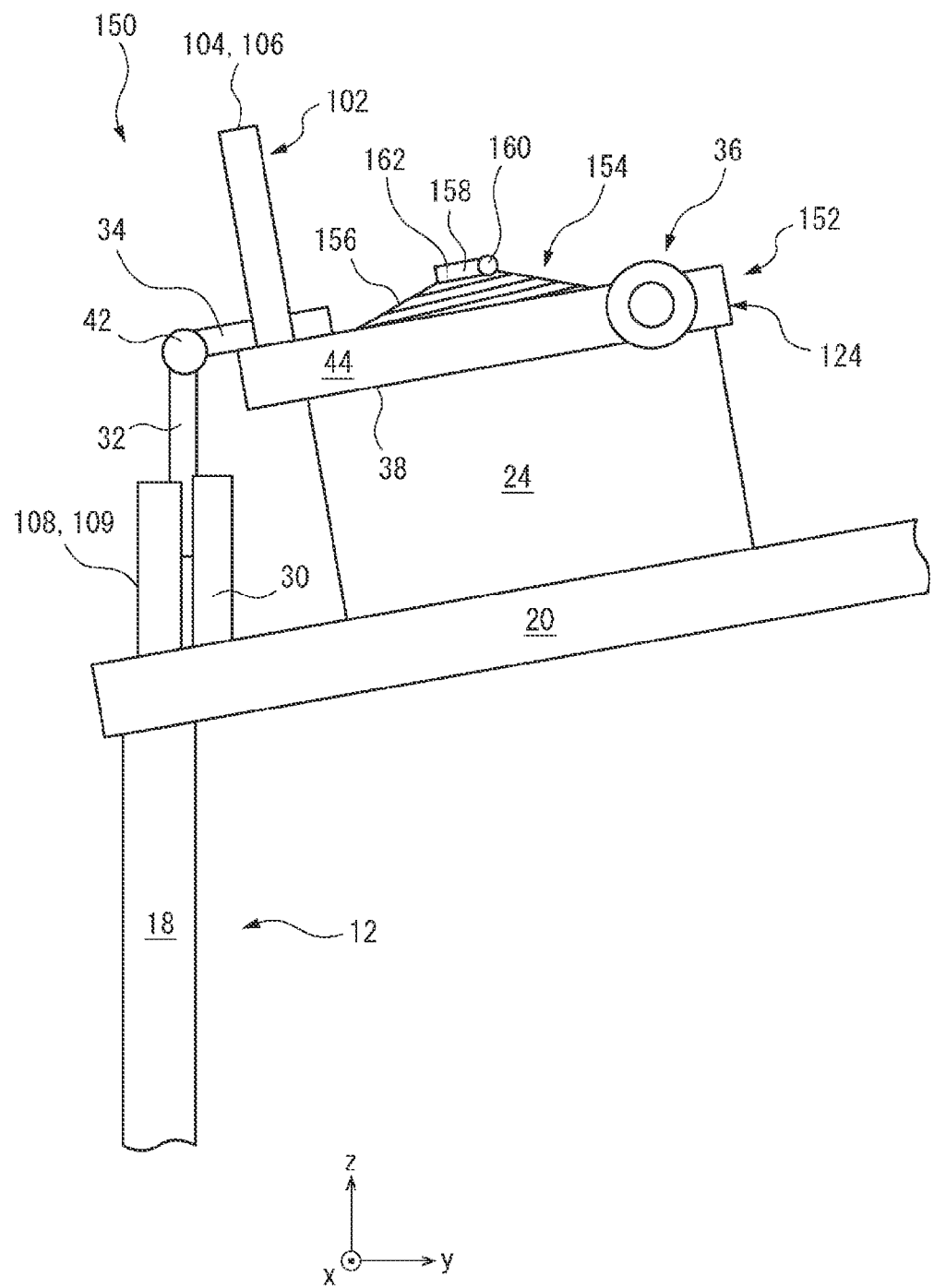
FIG. 22 is a side view of a lid mechanism according to another embodiment.

When the lid 152 is arranged at a closed position as illustrated in FIG. 22, the tubular portion 156 is folded and contracted and the door 158 closes the lid opening 162. On the other hand, when the lid 152 is rotated about the hinge shaft 42 from the closed position illustrated in FIG. 22 to an open position illustrated in FIG. 23, a first engaging portion 104 and a second engaging portion 106 of a movement restricting mechanism 102 engage with a first abutting portion 108 and a second abutting portion 109 of the storage rack 12, respectively, whereby rotation of the lid 152 is restricted and the lid 152 is arranged at the open position.

When the lid 152 is arranged at the open position, the tubular portion 156 expands and elongates vertically downward due to the action of gravity. As illustrated in FIG. 23, the expanded tubular portion 156 is tapered (in other words, decreases in the cross-sectional area) downward from its base end to the tip end (i.e., the lid opening 162).

Further, the door 158 rotates about the hinge shaft 160 to open the lid opening 162. In this way, the open and close door mechanism 154 expands vertically downward to form the lid opening 162 when the lid 152 is arranged at the open position, while it closes the lid opening 162 when the lid 152 is arranged at the closed position.

Figure 24:
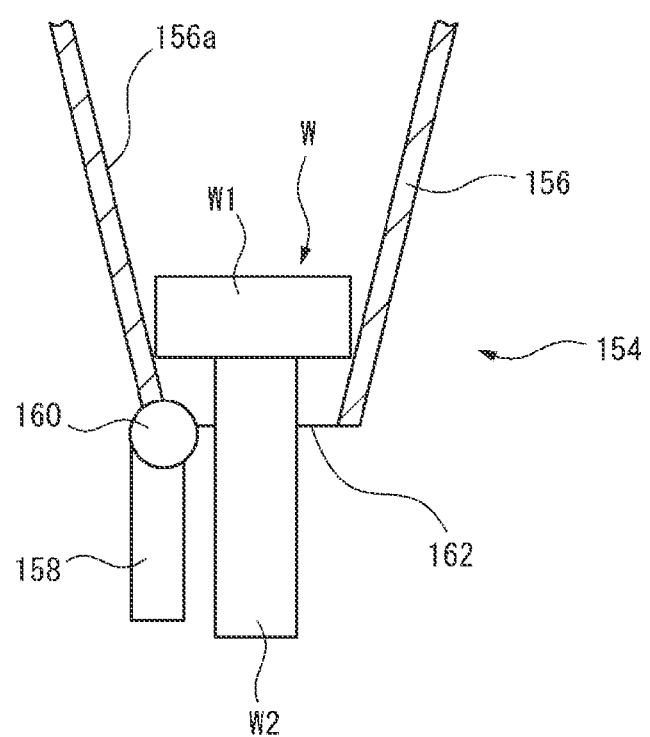
FIG. 24 is a diagram for explaining a function of an orientation adjusting mechanism illustrated in FIG. 23.

Similar to the open and close door mechanism 126 described above, the open and close door mechanism 154 can adjust the orientation of an article put into the through hole 128 (FIG. 18) when the lid 152 is arranged at the open position. This function will be described with reference to FIG. 24. As illustrated in FIG. 24, when the article W is put from above into the through hole 128 of the lid 152 arranged at the open position, the head W1 is locked to an inner peripheral surface 156*a* of the tubular portion 156, while the shaft W2 is received by the lid opening 162.

As a result, the orientation of the article W is adjusted such that the head W1 is arranged vertically above and the shaft W2 hangs vertically downward from the head W1. In the present embodiment, the open and close door mechanism 154 functions as an orientation adjusting mechanism that adjusts the orientation of an article W placed on the lid 152 arranged at the open position as described above. The tubular portion 156 is not limited to a stretchable member and may be, for example, a funnel-like solid member.

In the lid mechanism 120 or 150 described above, the movement restricting mechanism 62 (the fixed members 52 and 54) illustrated in FIG. 7 may be applied instead of the movement restricting mechanism 102 (the engaging portions 104 and 106) and the abutting portions 108 and 109 or alternatively the movement restricting mechanism 80 (specifically, the stopper hinge mechanism 74) and the fixed members 54 and 72 illustrated in FIG. 9 may be applied.

The article storage apparatus 10 is not limited to the storage rack 12 described above and various types of storage racks can be applied. Hereinafter, a storage rack 170 according to another embodiment will be described with reference to FIGS. 25 to 27. The storage rack 170 includes a plurality of long pillars 16, a plurality of short pillars 18, and a container installation frame 172. A plurality of containers 24A, 24B, and 24C are set on the container installation frame 172 such that they are arrayed in the y-axis direction.

Figure 26:
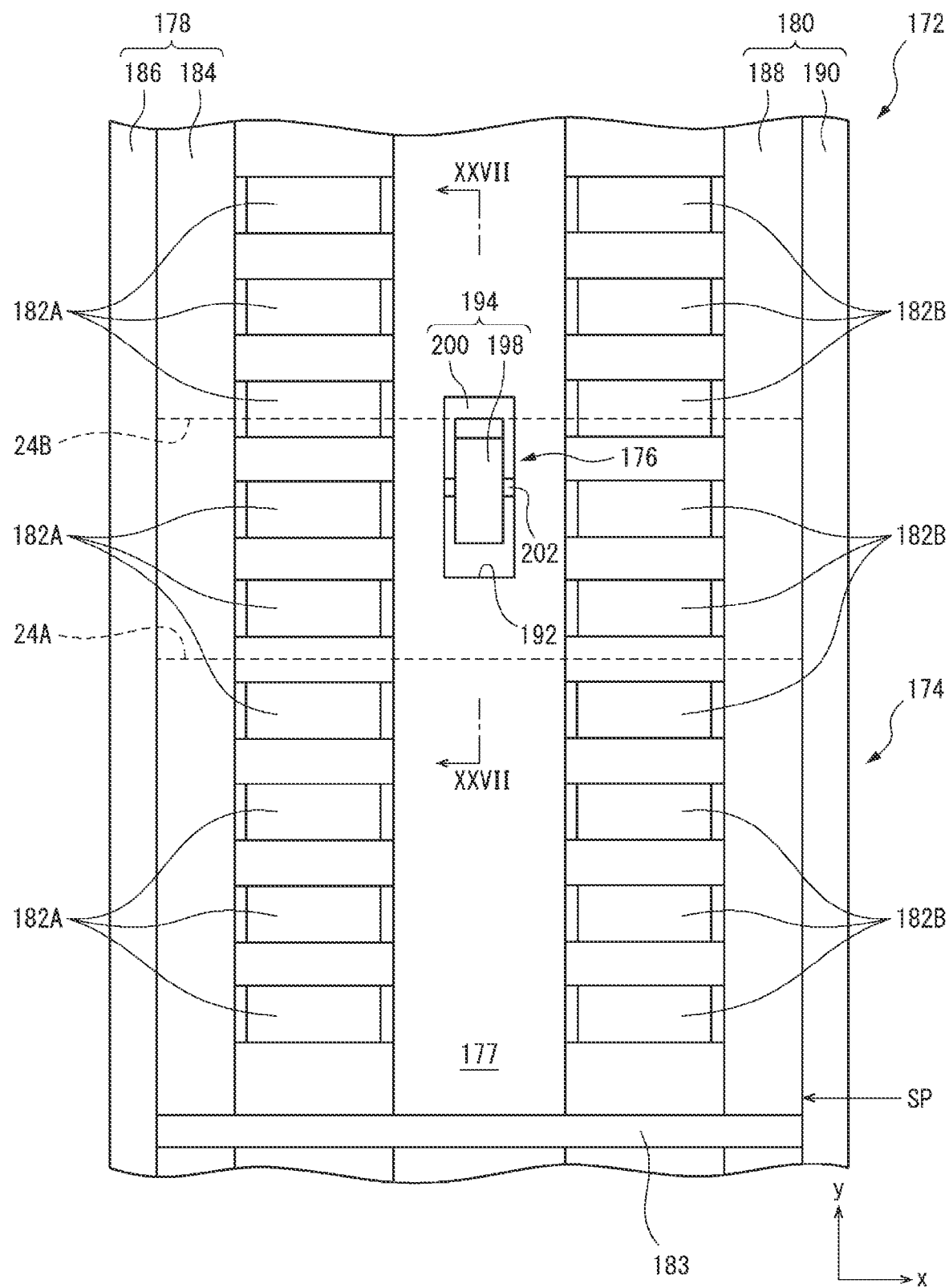
FIG. 26 is a view of an area D of the storage rack illustrated in FIG. 25 as viewed from arrow XXVI in FIG. 25.

As illustrated in FIG. 26, the container installation frame 172 includes a guide mechanism 174, a stopper mechanism 176, and a positioning member 183. The guide mechanism 174 guides the containers 24A, 24B, and 24C placed on the guide mechanism 174 such that they move toward a predetermined set position SP in the container installation frame 172 by the action of gravity.

Specifically, the guide mechanism 174 includes a central base 177, a pair of guide rails 178 and 180, a first row of rollers 182A arranged between the central base 177 and the guide rail 178, and a second row of rollers 1821 arranged between the central base 177 and the guide rail 180.

The central base 177 is arranged at the center of the container installation frame 172 in the x-axis direction and is arranged inclined with respect to the xy plane (e.g., the horizontal plane) such that it is directed upward toward the front. The pair of guide rails 178 and 180 are arranged separated from each other in the x-axis direction such that the central base 177 is arranged between them and are arranged inclined with respect to the xy plane (e.g., the horizontal plane) such that they extend parallel to the central base 177. The inclination angle of the central base 177 and the guide rails 178 and 180 with respect to the xy plane (horizontal plane) is, for example, 10°.

The guide rail 178 includes a base 184 and a guide wall 186 that rises upward from a left end of the base 184. Similarly, the guide rail 180 includes a base 188 and a guide wall 190 that rises upward from a right end of the base 188. Here, in the present embodiment, a substantially rectangular hole 192 is formed in the central base 177.

The first row of rollers 182A are arranged at substantially equal intervals such that they are arrayed along the y-axis. Each of the first row of rollers 182A is provided between the central base 177 and the base 184 such that it is rotatable about an axis substantially parallel to the x-axis. The second row of rollers 182B are arranged at substantially equal intervals such that they are arrayed along the y-axis. Each of the second row of rollers 182B is provided between the central base 177 and the base 188 such that it is rotatable about an axis substantially parallel to the x-axis.

The containers 24A, 24B, and 24C are placed between the guide walls 186 and 190 facing each other, and by the action of gravity applied to them, move toward the set position SP through the action of the rollers 182A and 182B while being prevented from falling off to the left and right by the guide walls 186 and 190. In this way, the guide mechanism 174 guides the placed containers 24A, 24B, and 24C to move toward the set position SP.

Figure 27:
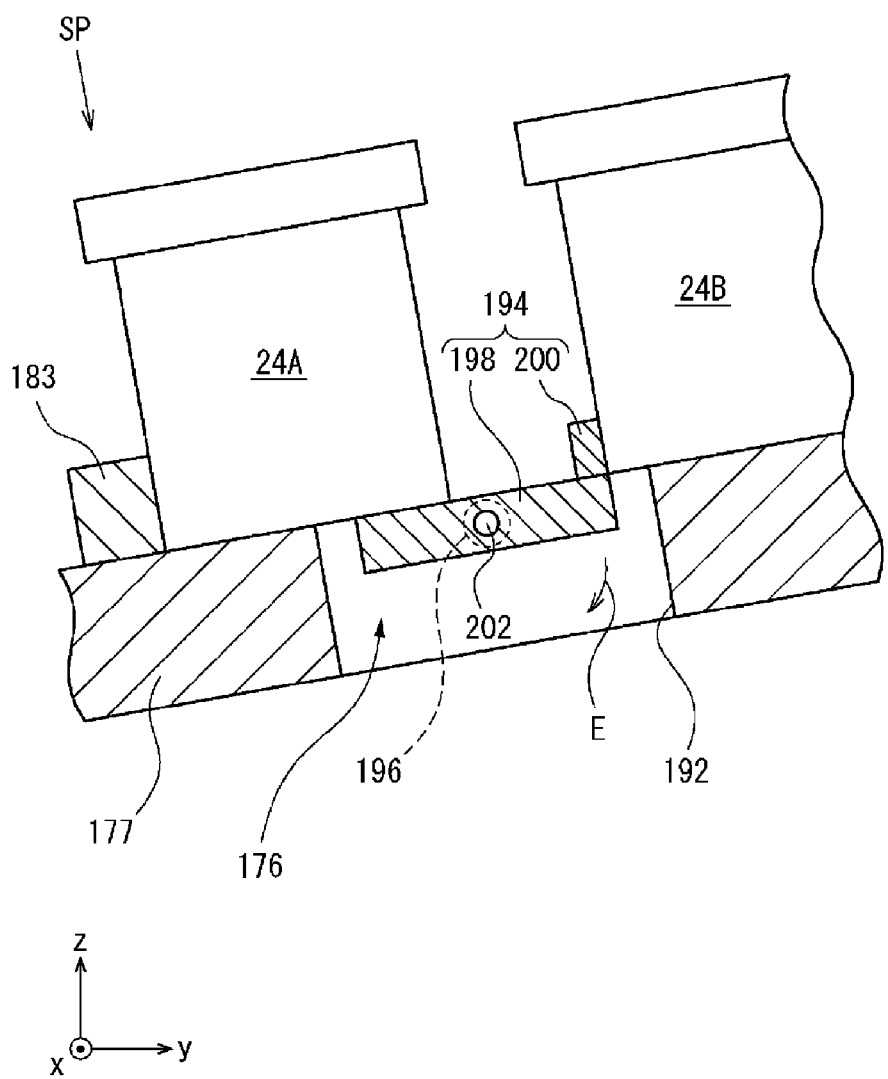
FIG. 27 is a cross-sectional view of the storage rack illustrated in FIG. 26 cut along XXVII-XXVII in FIG. 26.

The stopper mechanism 176 includes a stopper member 194 and an urging portion 196 (FIG. 27) urging the stopper member 194. As illustrated in FIG. 27, the stopper member 194 is received by a hole 192 formed in the central base 177 and is supported by the central base 177 such that it is rotatable via a shaft 202. Specifically, the stopper member 194 includes a stopper body 198 and a stopper wall 200 that protrudes upward from a front end of the stopper body 198.

The urging portion 196 urges the stopper member 194 in a direction indicated by an arrow E in FIG. 27 (i.e., in a clockwise direction when viewed from the right side). For example, the urging portion 196 is a torsion spring having one end connected to the stopper member 194 and the other end connected to the central base 177. Alternatively, the urging portion 196 may be a weight provided at a front end of the stopper body 198.

The positioning member 183 is fixed to the guide rails 178 and 180 such that it extends between the guide rails 178 and 180 and is arranged at a predetermined position on the rear side of the guide rails 178 and 180. The positioning member 183 defines the set position SP of the containers 24A, 24B, and 24C. That is, the containers 24A, 24B, and 24C guided to move rearward by the guide mechanism 174 abut to the positioning member 183 and then stop. The positions of the containers 24A, 24B, and 24C stopped by the positioning member 183 are the set position SP.

Figure 25:
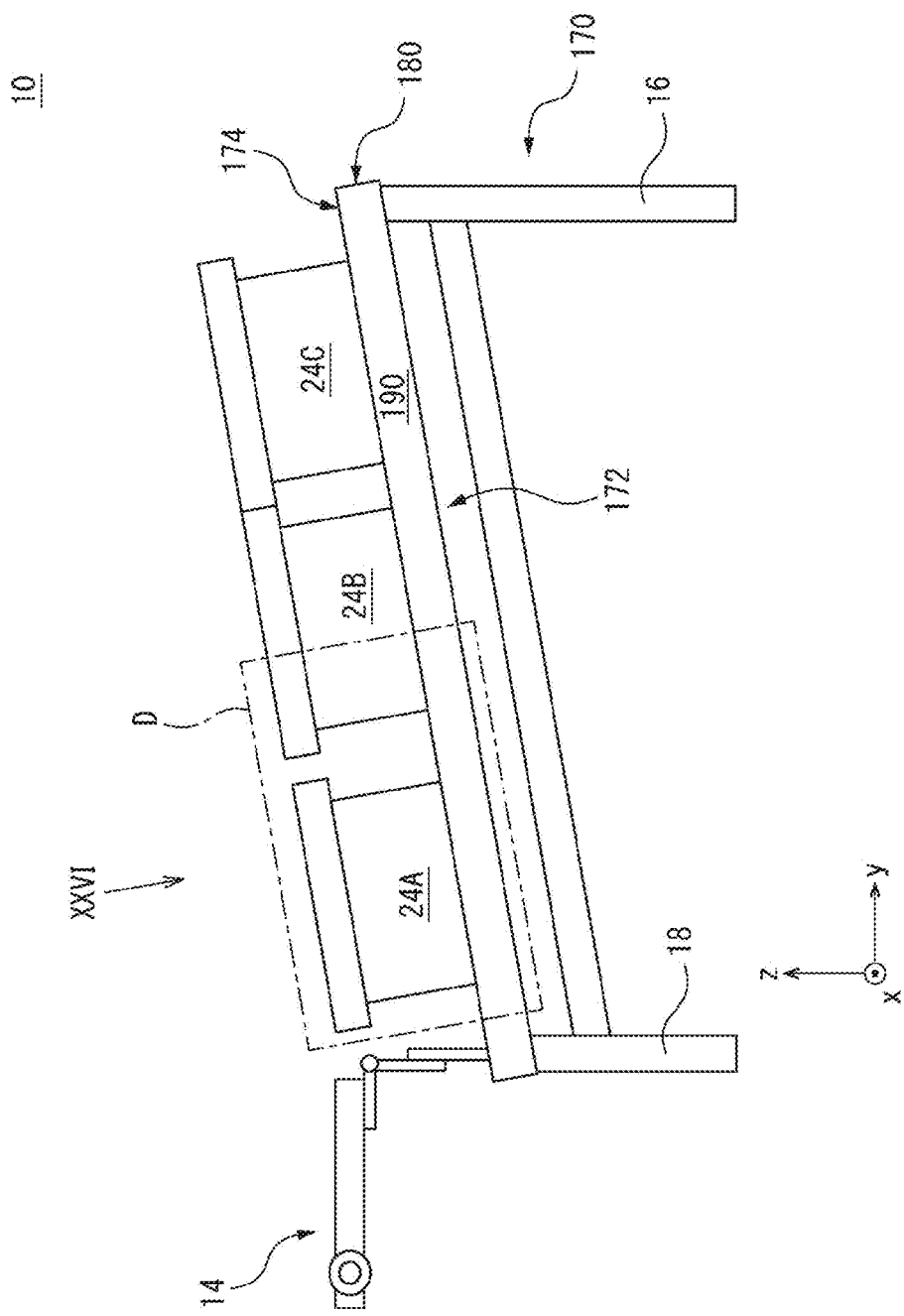
FIG. 25 is a side view of a storage rack according to another embodiment.

In the example illustrated in FIGS. 25 to 27, the container 24A is arranged at the set position SP and the containers 24B and 24C follow the container 24A. Here, in a state illustrated in FIG. 27, the container 24A arranged at the set position SP rides on the stopper body 198, whereby the stopper member 194 is arranged in a first position such that the stopper wall 200 protrudes upward from the hole 192. At this time, the stopper wall 200 engages with the container 24B following the container 24A, thereby restricting movement of the container 24B in the direction toward the set position SP. As a result, the container 24A and the container 24B are separated from each other.

Figure 28:
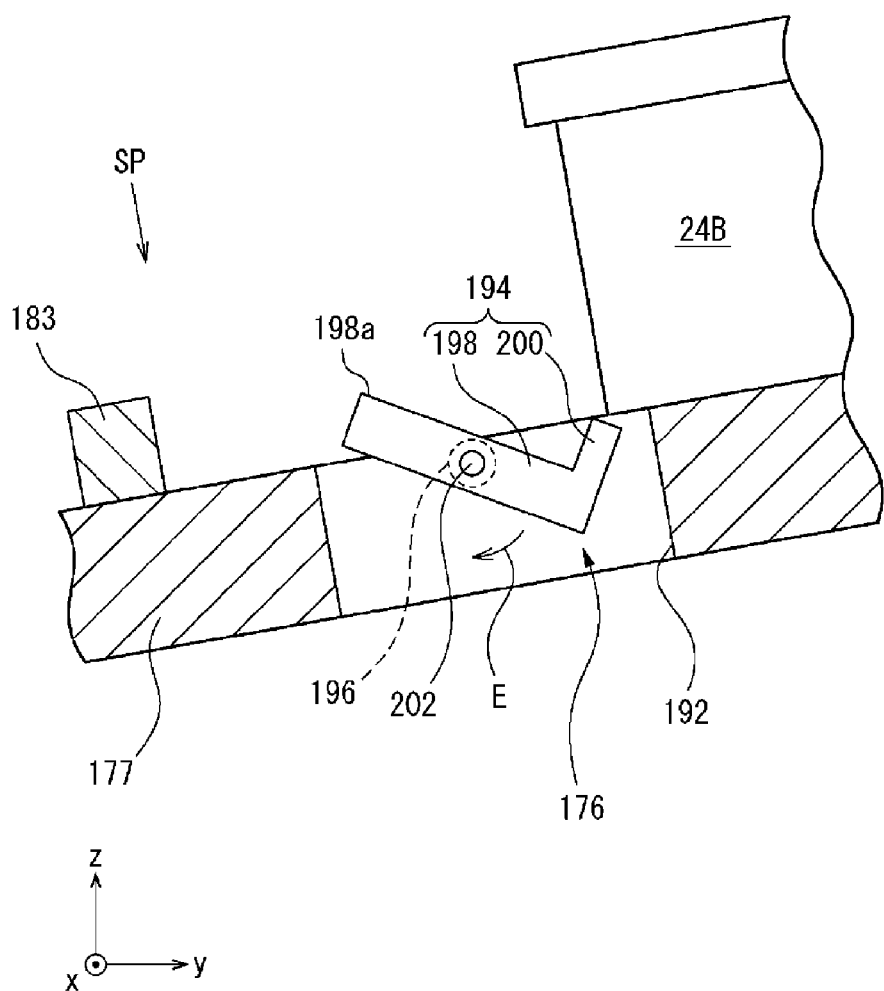
FIG. 28 is illustrating a state in which a stopper member illustrated in FIG. 27 is arranged in a second position.

On the other hand, when the container 24A has been removed from the container installation frame 172 as illustrated in FIG. 28, the stopper member 194 rotates in a direction E by the action of the urging portion 196 and is arranged in a second position illustrated in FIG. 28. When the stopper member 194 is arranged in the second position, the stopper wall 200 is received in the hole 192, while a rear end 198a of the stopper body 198 protrudes upward from the hole 192.

Then, when the container 24B is guided by the guide mechanism 174 and reaches the set position SP in which it abuts to the positioning member 183, the container 24B rides on the rear end 198a of the stopper body 198, thereby rotating the stopper member 194 in a direction opposite to the direction E against the action of the urging portion 196.

As a result, the stopper member 194 returns to the first position illustrated in FIG. 27 and the stopper wall 200 engages with the container 24C following the container 24B to restrict movement of the container 24C in the direction toward the set position SP. Thus, the container 24B and the container 24C are separated from each other.

As described above, the stopper mechanism 176 restricts movement of the subsequent container 24B (or 24C) when the container 24A (or 24B) has reached the set position SP by the guide mechanism 174, thereby separating the container 24A (or 24B) and the container 24B (or 24C) from each other. According to this configuration, when the container 24A (or 24B) arranged at the set position SP has moved to the closed position in order to close the container 24A (or 24B), it is possible to prevent the container 24B (or 24C) following the container 24A (or 24B) from interfering with the lid 28 of the container 24A (or 24B) and hindering the closing operation of the lid 28.

It is also possible to, when removing the container 24A (or 24B) arranged at the set position SP, prevent the subsequent container 24B (or 24C) from interfering with the container 24A (or 24B) and hindering the removal operation of the container 24A (or 24B). Constructing the stopper mechanism 176 from the stopper member 194 and the urging portion 196 can also realize the function of the stopper mechanism 176 described above with a simpler structure.

Further, according to the present embodiment, tasks such as automatically arranging a plurality of containers 24A, 24B, and 24C at the set position SP in order and taking out articles stored in the containers 24A, 24B, and 24C can be smoothly performed for each of the containers 24A, 24B and 24C by the guide mechanism 174. This can automate tasks while achieving a reduction in the cycle time of tasks.

The urging portion 196 may include a pneumatic or hydraulic cylinder instead of the torsion spring. In this case, the stopper member 194 may be received in the hole 192 such that it can advance or retreat along the axis of a straight line between the first position where the stopper wall 200 protrudes upward from the hole 192 and the second position where the stopper wall 200 is received in the hole 192. Then, the urging portion 196 (the cylinder) may cause the stopper member 194 to advance or retreat between the first position and the second position.

Figure 29:
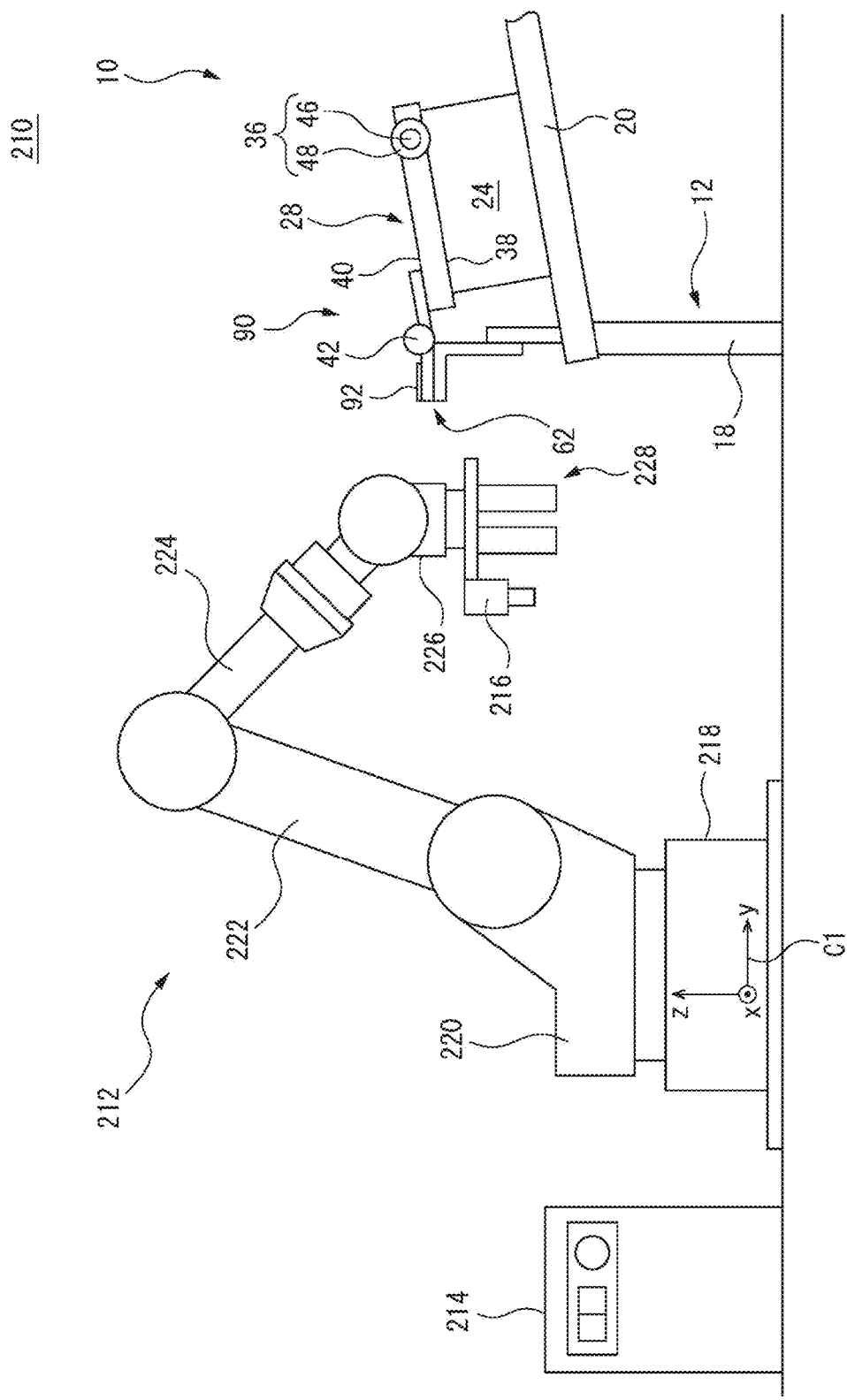
FIG. 29 is a diagram of a picking system according to an embodiment.
Figure 30:
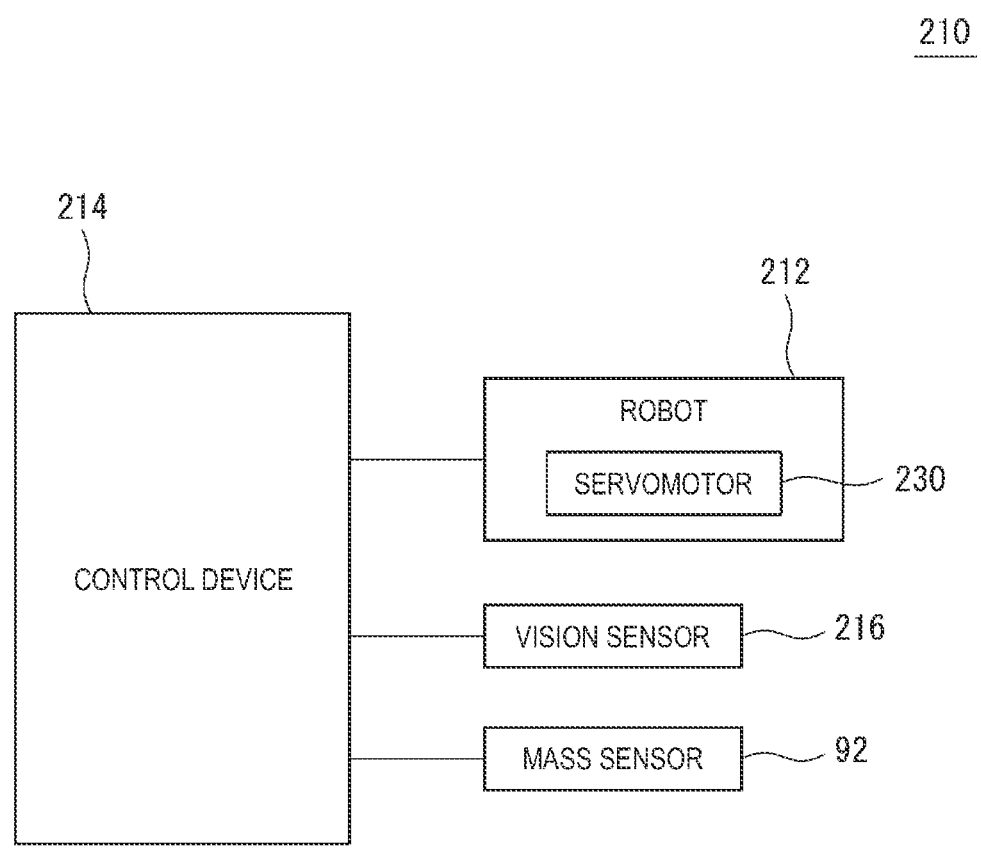
FIG. 30 is a block diagram of the picking system illustrated in FIG. 29.

Next, a picking system 210 according to an embodiment will be described with reference to FIGS. 29 and 30. The picking system 210 includes a robot 212, a control device 214, a vision sensor 216, and the article storage apparatus 10 illustrated in FIGS. 11 and 12. In the present embodiment, the robot 212 is a vertical articulated robot and includes a robot base 218, a swivel body 220, a lower arm 222, an upper arm 224, a wrist 226, and a hand 228.

The robot base 218 is fixed to the floor of a work cell. The swivel body 220 is provided to the robot base 218 such that it is swivelable about a vertical axis. The lower arm 222 is rotatably provided at the swivel body 220 about a horizontal axis and the upper arm 224 is rotatably provided at a tip end of the lower arm 222. The wrist 226 is rotatably connected to a distal end of the upper arm 224 and the hand 228 rotates about the wrist axis.

The hand 228 is detachably connected to a distal end flange of the wrist 226. In an example, the hand 228 is an openable/closable hand including a plurality of openable/closable fingers and configured to grasp and grip an article with the fingers. In another example, the hand 228 is a suction type hand including an electromagnet, a vacuum device, a suction cup, or the like and configured to suck and grip an article. In yet another example, the hand 228 may include an openable/closable hand and a suction type hand. In this case, the hand 228 may grip the rotary gripping section 36 with the openable/closable hand and grip an article in the container 24 with the suction type hand.

Servomotors 230 (FIG. 30) are built in to each of the components (i.e., the robot base 218, the swivel body 220, the lower arm 222, the upper arm 224, and the wrist 226) of the robot 212. The servomotors 230 drive each movable component (i.e., the swivel body 220, the lower arm 222, the upper arm 224, and the wrist 226) of the robot 212 in response to a command from the control device 214.

A robot coordinate system C1 is set in the robot 212. The robot coordinate system C1 is a coordinate system for controlling the operation of each movable element of the robot 212 and is fixed in a three-dimensional space. In the present embodiment, the robot coordinate system C1 is set with respect to the robot 212 such that its origin is arranged at the center of the robot base 218 and its z-axis coincides with the swivel axis of the swivel body 220.

The vision sensor 216 is fixed in a known positional relationship with respect to the hand 228 (or a TCP). The vision sensor 216 is, for example, a camera or a three-dimensional vision sensor and includes an imaging sensor (such as CCD or CMOS) that receives a subject image and performs photoelectric conversion and an optical system (such as a condenser lens or a focusing lens) that guides the subject image to the imaging sensor. The vision sensor 216 captures an image of an article and transmits the captured image data to the control device 214. The control device 214 acquires the position of the article, captured in the image data, in the robot coordinate system C1 based on the image data captured by the vision sensor 216.

The control device 214 is a computer including a processor (such as a CPU or a GPU) and a memory (such as a ROM or a RAM) and controls the operation of the robot 212. The control device 214 controls the robot 212 based on the image data from the vision sensor 216 and mass data from the mass sensor 92 of the article storage apparatus 10 such that the robot 212 performs an operation of opening the lid 28 of the article storage apparatus 10 and taking out an article stored in the container 24.

Hereinafter, the operation of the picking system 210 will be described with reference to FIG. 31. A process illustrated in FIG. 31 starts when the control device 214 has received a task start command from an operator, a host controller, or a computer program. When the process of FIG. 31 has started, the container 24 is positioned at the set position SP on the container installation frame 20 and the lid 28 of the lid mechanism 90 is arranged at the closed position, in the article storage apparatus 10.

In step S1, the control device 214 captures an image of the rotary gripping section 36 of the lid mechanism 90 by the vision sensor 216 and acquires the position of the rotary gripping section 36 in the robot coordinate system C1. Specifically, the control device 214 operates the robot 212 to position the vision sensor 216 at a position where the rotary gripping section 36 lies within the field of view of the vision sensor 216.

Next, the control device 214 captures an image of the rotary gripping section 36 by the vision sensor 216 and acquires the captured image data from the vision sensor 216. Next, the control device 214 acquires the position of the gripping ring 48 of the rotary gripping section 36 in the robot coordinate system C1 based on the acquired image data.

In step S2, the control device 214 opens the lid 28 by the robot 212. Specifically, the control device 214 controls the robot 212 based on the position of the gripping ring 48 in the robot coordinate system C1 acquired in the latest step S1 such that the robot 212 grips the gripping ring 48 with the hand 228.

Next, the control device 214 operates the robot 212 to move the hand 228, gripping the gripping ring 48, along an arc-shaped track about the hinge shaft 42, thereby moving the lid 28 from the closed position to the open position. As a result, the lid 28 is arranged in the open position illustrated in FIG. 12. At this time, by the movement restricting mechanism 62, the lid 28 is held parallel to the horizontal plane and the first surface 38 of the lid 28 faces vertically upward.

In step S3, the control device 214 determines whether the lid 28 has been normally arranged in the open position in step S2. Here, the gravity of the lid 28 is applied to the mass sensor 92 when the lid 28 has been normally opened and arranged in the open position. Thus, the mass sensor 92 can detect the mass of the lid 28 arranged in the open position. On the other hand, the mass sensor 92 does not detect the mass of the lid 28 when the lid 28 has not been normally opened and remains at the closed position.

Therefore, in this step S3, the control device 214 acquires data of the mass M1, detected by the mass sensor 92 at this time, from the mass sensor 92. The data of the mass M1 may be data representing the mass (in units of kg) as a numerical value or may be an electric signal corresponding to the mass M1.

Then, the control device 214 determines whether the acquired mass M1 is within a predetermined allowable range [$\alpha$, $\beta$] and determines that the lid 28 has been normally opened (i.e., YES) when $\alpha \leq M1 \leq \beta$. Here, the threshold values a and 11 of the allowable range [$\alpha$, $\beta$] can be set based on the mass ML of the lid 28 because the actual mass ML can be measured in advance.

The control device 214 proceeds to step S4 upon determining YES, and on the other hand, returns to step S1 upon determining NO. In the present embodiment, the control device 214 determines whether the lid 28 has been normally arranged in the open position based on the data of the mass M1 detected by the mass sensor 92 as described above.

In step S4, the control device 214 captures an image of articles (such as bolts, nuts, or connecting rods) in the container 24 by the vision sensor 216 and acquires the position of the article, to be taken out, in the robot coordinate system C1. Specifically, the control device 214 operates the robot 212 to position the vision sensor 216 at a position where at least one article in the container 24 lies within the field of view of the vision sensor 216.

Next, the control device 214 captures an image of an article by the vision sensor 216 and acquires the captured image data from the vision sensor 216. Next, the control device 214 analyzes the acquired image data, identifies an article to be taken out from articles imaged in the image data, and acquires the position of the article in the robot coordinate system C1.

In step S5, the control device 214 takes out the article from the container 24 and places it on the lid 28 by the robot 212. Specifically, the control device 214 controls the robot 212 based on the position of the article in the robot coordinate system C1 acquired in the latest step S4 such that the robot 212 grips the article with the hand 228 through the opening 26 and takes out the article from the container 24. Next, the control device 214 operates the robot 212 to move the hand 228 gripping the article above the lid 28 arranged in the open position and causes the hand 228 to release the article. As a result, the article is placed on the first surface 38 of the lid 28 arranged in the open position.

In step S6, the control device 214 estimates the number n of articles placed on the lid 28. Here, for example, when a hand 228 including an electromagnet is used, a plurality of articles can be taken out in step S5. In step S6, the control device 214 estimates the number n of articles placed on the lid 28 based on the data of the mass detected by the mass sensor 92.

Specifically, the control device 214 acquires the data of the mass M2, detected by the mass sensor 92 at this time, from the mass sensor 92. The mass M2 detected by the mass sensor 92 at this time is a value obtained by adding the product of the mass MA of a single article and the number n of articles placed on the lid 28 to the mass ML of the lid 28 (i.e., M2=ML+MA×n). The control device 214 can estimate the number n from an equation n=(M2−ML)/MA because the mass ML of the lid 28 and the mass MA of a single article can be measured in advance. In this way, the control device 214 estimates the number n of articles placed on the lid 28 at this time.

In step S7, the control device 214 determines whether the number n estimated in the latest step S6 is zero (n=0). The control device 214 returns to step S4 upon determining that n=0 (i.e., YES), and on the other hand, proceeds to step S8 upon determining that n≥1 (i.e., NO). In the present embodiment, the control device 214 determines the presence or absence of an article placed on the lid 28 arranged in the open position based on the mass M2 detected by the mass sensor 92 as described above.

In step S8, the control device 214 captures an image of articles placed on the lid 28 by the vision sensor 216 and acquires the position of an article, to be transported, in the robot coordinate system C1. Specifically, the control device 214 captures an image of articles placed on the lid 28 by the vision sensor 216 and acquires the captured image data from the vision sensor 216. Next, the control device 214 analyzes the acquired image data and identities the number $n_1$ of articles imaged in the image data. Then, the control device 214 identifies an article to be taken out from the articles imaged in the image data and acquires the position of the article in the robot coordinate system C1.

In step S9, the control device 214 determines whether an image of the articles has been normally captured in the latest step S8. Specifically, the control device 214 determines whether the number n estimated in the latest step S6 and the number $n_1$ identified from the image data in step S8 match.

Here, when an image of articles has been captured in step S8, it may not be possible to accurately identify all articles placed on the lid 28 because not all articles are clearly imaged in the captured image data due to factors such as reflected light, noise, or optical specifications of the vision sensor 216 (such as the number of pixels of the image sensor).

Therefore, in step S9, the control device 214 determines whether the number n estimated in step S6 and the number $n_1$ identified from the image data in step S8 match, and when they match, the control device 214 determines YES and proceeds to step S10. On the other hand, upon determining NO, the control device 214 returns to step S8 and repeats steps S8 and S9 until determining YES in step S9.

When the number of times NO has been determined in step S9 reaches a predetermined number of times (e.g., 5 times), the control device 214 may generate an alarm signal in the form of voice or an image and output it to the operator. Alternatively, when the number of times NO has been determined in step S9 reaches the predetermined number of times, the control device 214 may proceed to step S1 again after closing the lid 28 by the robot 212. Then, when the number of times such a loop has been repeated reaches a predetermined number of times, the control device 214 may stop the operation of the robot 212, generate an alarm signal, and output it to the operator. The control device 214 determines whether the vision sensor 216 has normally captured an image of articles in step S8 based on both on the data of the mass M2 detected by the mass sensor 92 in step S6 and the image data captured by the vision sensor 216 as described above.

In step S10, the control device 214 grips an article on the lid 28 and transports it to a predetermined storage location by the robot 212. Specifically, the control device 214 controls the robot 212 based on the position of the article in the robot coordinate system C1 acquired in the latest step S8 such that the robot 212 grips the article placed on the lid 28 with the hand 228. Then, the control device 214 operates the robot 212 to move the hand 228 gripping the article to the storage location and causes the hand 228 to release the article. As a result, the article is stored in the storage area.

In step S11, the control device 214 determines whether transporting of all articles on the lid 28 have been completed. For example, the control device 214 may determine YES when the number n of articles estimated in the latest step S6 (or the number $n_1$ identified in the latest step S8) is "1." The control device 214 proceeds to step S12 upon determining YES, and on the other hand, returns to step S6 upon determining NO.

In step S12, the control device 214 determines whether the task of taking out and transporting all articles in the container 24 has been completed. For example, the control device 214 stores the total number ns of articles stored in the container 24 in advance and counts the number of times m step S10 has been performed. Then, the control device 214 determines YES when the number of times m matches the total number ns. The control device 214 proceeds to step S13 upon determining YES and returns to step S4 upon determining NO.

In step S13, the control device 214 closes the lid 28 by the robot 212. Specifically, first, the control device 214 captures an image of the rotary gripping section 36 of the lid 28, arranged in the open position, by the vision sensor 216 and acquires the position of the gripping ring 48 in the robot coordinate system C1 from the captured image data.

Then, the control device 214 controls the robot 212 based on the acquired position of the gripping ring 48 in the robot coordinate system C1 such that the robot 212 grips the gripping ring 48 with the hand 228. Then, the control device 214 operates the robot 212 to move the hand 228 gripping the gripping ring 48 in a direction opposite to that at the time of opening the lid in step S2 along the arc-shaped track about the hinge shaft 42. Thus, the lid 28 is arranged at the closed position illustrated in FIG. 11. Then, the control device 214 ends the process illustrated in FIG. 31.

According to the present embodiment, the robot 212 performs a task of gripping and opening the lid 28 arranged at the closed position with the hand 228, and when the lid 28 is arranged in the open position, gripping and taking out articles stored in the container 24 with the hand 228 through the opening 26 as described above. According to this configuration, the task of opening the lid of the container 24 and taking out articles can be automated.

In addition, in the present embodiment, the control device 214 controls the robot 212 such that it temporarily places an article gripped by the hand 228 on the first surface 38 of the lid 28 (step S5) and thereafter re-grips the article temporarily placed on the first surface 38 of the lid 28 with the hand 228 and transports it to the storage location (step S10).

Here, in the present embodiment, the first surface 38 of the opened lid 28 can be used as a temporary storage location for the taken out article because the movement restricting mechanism 62 can stably hold the lid 28 in the open position. According to this configuration, it is not necessary to separately provide a structure for the temporary storage location, and thus the manufacturing cost of the picking system 210 can be reduced.

Further, in the present embodiment, the movement restricting mechanism 62 holds the lid 28 arranged in the open position parallel to the horizontal plane. According to this configuration, when an article has been temporarily placed on the first surface 38 in step S5, the article can be quickly stopped. This enables smoothly performing the operation of holding an article again in steps S8 to S10.

Furthermore, in the present embodiment, the control device 214 determines whether the lid 28 has been normally arranged in the open position based on the data of the mass M1 detected by the mass sensor 92 (step S3). According to this configuration, the control device 214 can quickly determine the normal opening of the lid 28 and can smoothly proceed to the subsequent process step (step S4 or S1), which leads to a reduction in the cycle time.

In addition, in the present embodiment, the control device 214 determines the presence or absence of an article placed on the lid 28 arranged in the open position based on the data of the mass M2 detected by the mass sensor 92 (step S7). According to this configuration, if the result of step S5 is a case or the like where an article cannot be properly temporarily placed due to falling off from the lid 28, the control device 214 can quickly detect that there is no article on the lid 28 and perform the temporary placement process of steps S4 and S5 again. In other words, it is possible to quickly and reliably detect whether an article taken out from the container 24 is properly placed on the lid 28.

Further, in the present embodiment, the control device 214 determines whether the vision sensor 216 has normally captured an image of articles based on the data of the mass M2 detected by the mass sensor 92 (step S9). According to this configuration, the control device 214 can quickly determine whether the image data captured in step S8 is appropriate (i.e., all articles can be recognized normally) and can smoothly proceed to the subsequent process step (step S10 or S8), which leads to a reduction in the cycle time.

In the picking system 210, the lid mechanism 50, 70, 100, or 110 described above can be applied instead of the lid mechanism 90. In this case, steps S3, S6, and S9 are omitted from the process illustrated in FIG. 31 because the mass sensor 92 is omitted.

On the other hand, the lid mechanism 70 described above may be configured such that the stopper hinge mechanism 74 of the lid mechanism 70 is provided with a torque sensor that can detect a torque applied about the hinge shaft 42, and the mass of the lid 28 and articles placed on the lid 28 is detected from the torque. When such a lid mechanism 70 is applied to the picking system 210, the control device 214 can perform the process illustrated in FIG. 31.

In the lid mechanism 100 described above, the mass sensor 92 may be provided on the surface of the first engaging portion 104 or the abutting portion 108 (or the second engaging portion 106 or the abutting portion 109) such that, when the lid 28 is arranged in the open position (FIG. 15), the mass sensor 92 is interposed between the first engaging portion 104 and the abutting portion 108 (or the second engaging portion 106 and the abutting portion 109) facing each other. The mass sensor 92 thus installed can detect the mass of the lid 28 and articles placed on the lid 28. When such a lid mechanism 100 is applied to the picking system 210, the control device 214 can perform the process illustrated in FIG. 31.

In the picking system 210, a proximity sensor that can detect the lid 28 arranged in the open position may be provided instead of (or in addition to) the mass sensor 92. This proximity sensor transmits a lid opening detection signal to the control device 214 when the lid 28 is arranged in the open position. The control device 214 may determine YES upon receiving the lid opening detection signal in step S3 described above.

In the robot 212, a force sensor that can detect an external force applied to the hand 228 may be provided, for example, on the robot base 218 or the wrist 226. Alternatively, a force sensor (specifically, a torque sensor) that can detect a torque applied to the output shaft of each servomotor 230 of the robot 212 may be provided.

The control device 214 can detect the mass of an object gripped by the hand based on detection data of the force sensor. In this case, the control device 214 may lift the lid 28, on which the object has been temporarily placed, by the hand 228 in step S6 described above and acquire the mass M2 (=ML+MA×n) described above based on detection data that the force 21) sensor has detected at this time, and thereby estimate the number n of articles placed on the lid 28.

Figure 32:
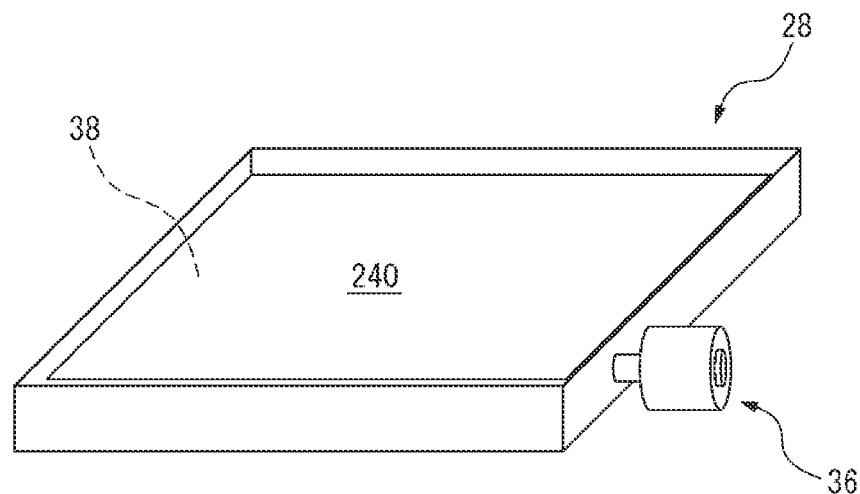
FIG. 32 is a diagram of an elastic covering according to an embodiment.

In the picking system 210, an elastic covering may also be provided on the first surface 38 of the lid 28. Such a form is illustrated in FIG. 32. FIG. 32 is illustrating only the lid 28 for the sake of easy understanding. An elastic covering 240 is provided on the first surface 38 of the lid 28 illustrated in FIG. 32.

The elastic covering 240 is a flat sheet-like member formed of an elastic material such as a rubber material, a urethane material, or an elastic resin material and is bonded to the first surface 38, for example, by an adhesive. Providing the elastic covering 240 can absorb an impact applied to the lid 28 when an article is temporarily placed on the first surface 38 of the lid 28 arranged in the open position. Forming the elastic covering 240 with an elastic material having a high coefficient of friction coefficient with respect to articles can limit positional displacement of the temporarily placed articles.

Figure 33:
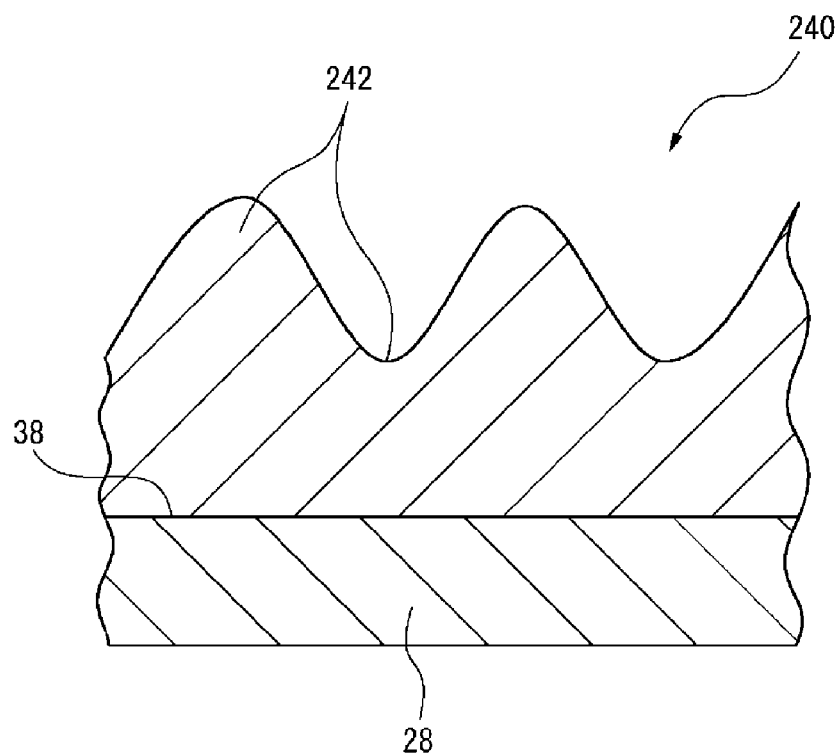
FIG. 33 is a diagram of an elastic covering according to another embodiment.

The elastic covering 240 is not limited to the flat sheet-like member and may include a concave-convex portion on the surface thereof. Such a form is illustrated in FIG. 33. In the elastic covering 240 illustrated in FIG. 33, a wavy concave-convex portion 242 is formed on the surface thereof. When an article is temporarily placed on the first surface 38 of the lid 28 arranged in the open position, this concave-convex portion 242 can efficiently prevent positional displacement of the article as the article fits to the concave-convex portion 242.

Providing the elastic covering 240 as described above can more stably stop an article when the article is temporarily placed on the first surface 38 in step S5, and thus the operation of holding an article again in steps S8 to S10 can be performed more smoothly and with high accuracy.

The color of the elastic covering 240 may be selected such that the article can be easily detected in the image data captured by the vision sensor 216 in step S8. For example, the color of the elastic covering 240 can be set to black, whereby the elastic covering 240 that is the background of the article can be prevented from being conspicuous as a visual feature in the image data. This allows the article to be identified with high accuracy by image analysis in step S8.

In the form illustrated in FIG. 33, the elastic covering 240 is provided with the concave-convex portion 242, while the concave-convex portion 242 may be integrally formed on the first surface 38. That is, in this case, the concave-convex portion 242 is formed on the first surface 38. In this case, it is also possible to prevent positional displacement of the article temporarily placed on the first surface 38.

Figure 34:
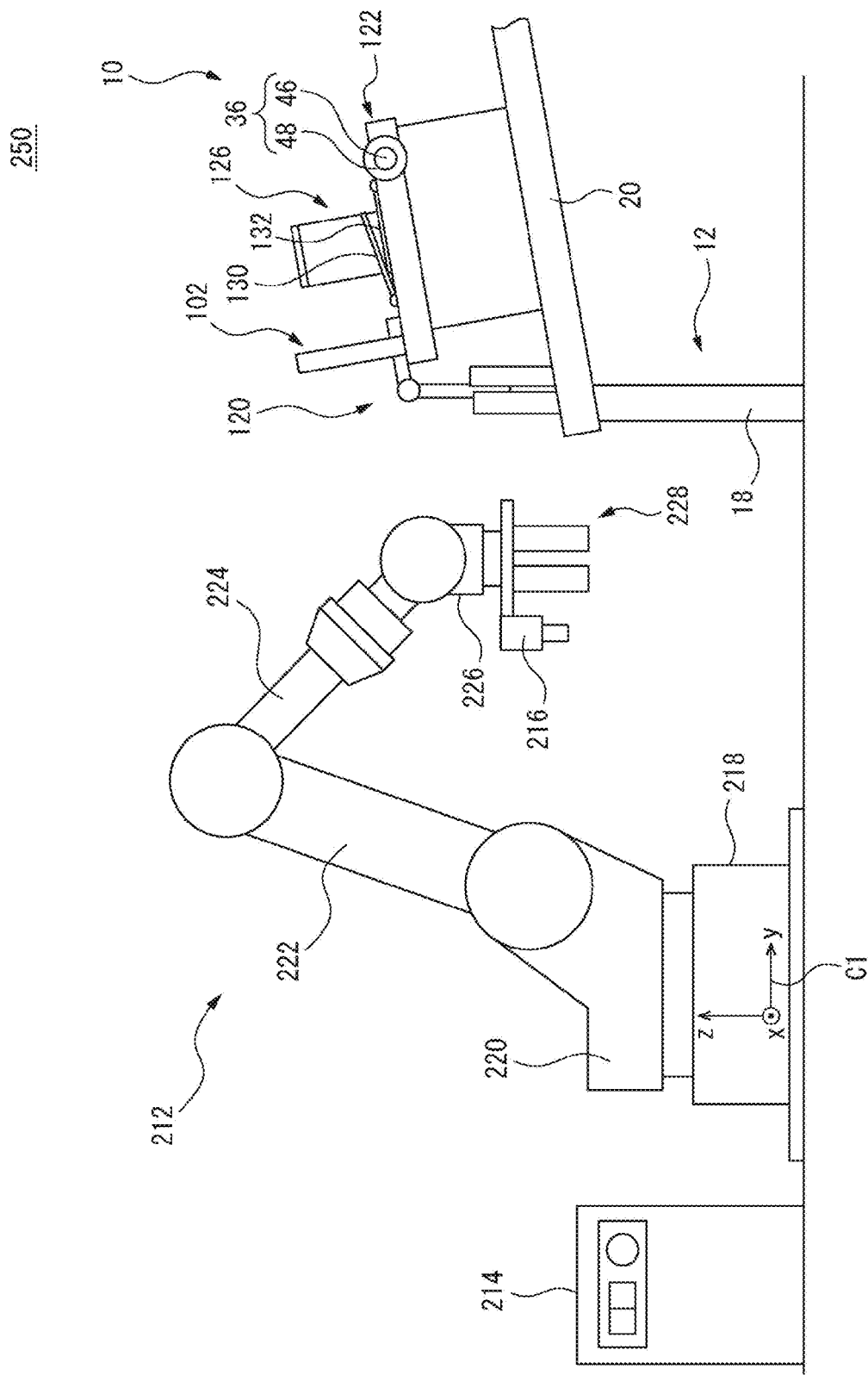
FIG. 34 is a diagram of a picking system according to another embodiment.

Next, a picking system 250 according to another embodiment will be described with reference to FIG. 34. The picking system 250 includes the robot 212, the control device 214, the vision sensor 216, and the article storage apparatus 10 illustrated in FIGS. 17 to 21. Hereinafter, the operation of the picking system 250 will be described with reference to FIG. 35. In the process illustrated in FIG. 35, the same process steps as those of FIG. 31 are assigned the same step numbers and detailed description thereof will be omitted.

Figure 35:
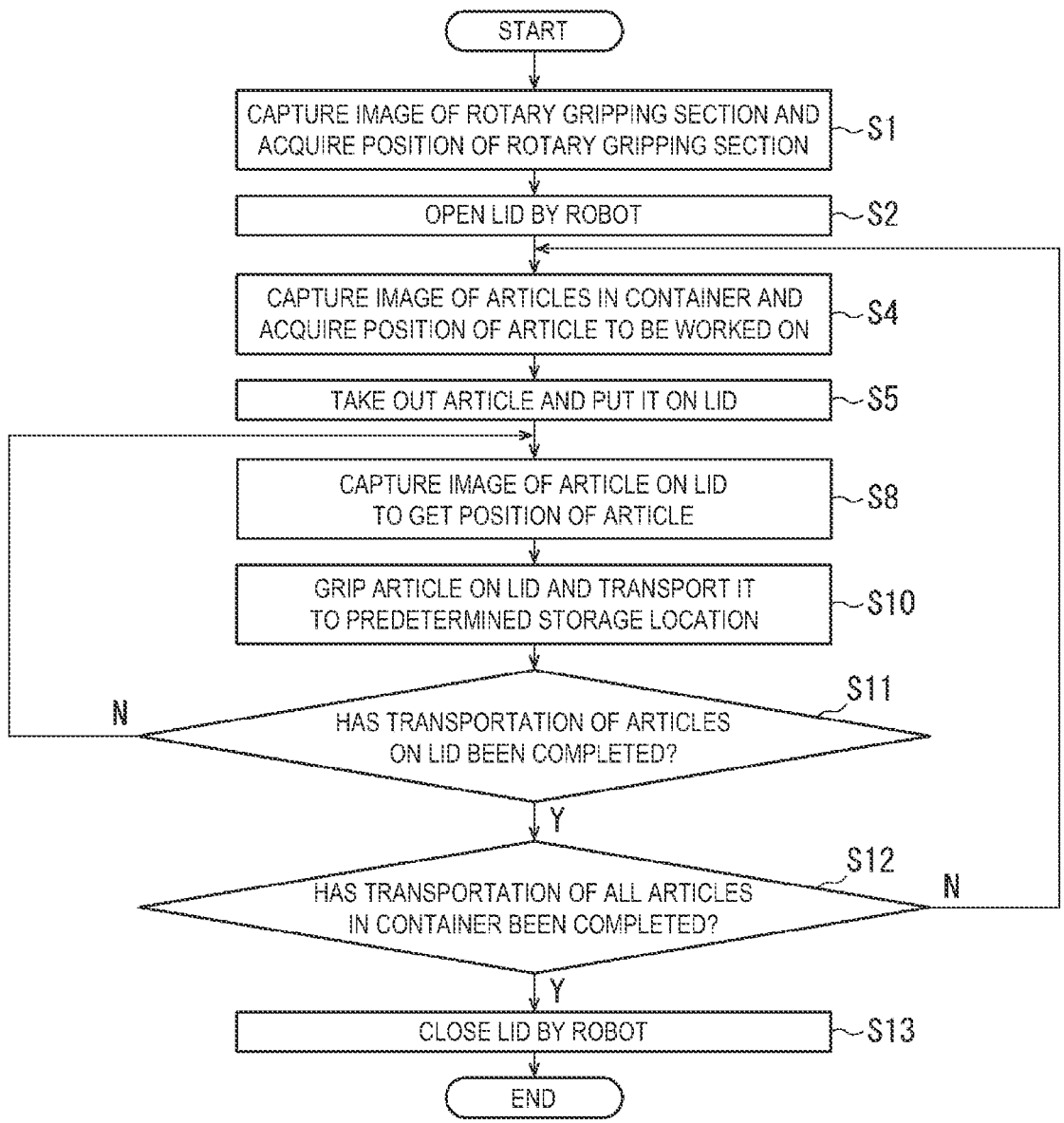
FIG. 35 is a flowchart illustrating an example of an operation process of the picking system illustrated in FIG. 34.

After starting the process illustrated in FIG. 35, the control device 214 performs steps S1, S2, and S4 described above. Here, when the lid 122 is arranged in the open position in step S2, the pair of doors 130 and 132 of the open and close door mechanism 126 opens to form the lid opening 144 as illustrated in FIG. 19.

In step S5, the control device 214 takes out an article from the container 24 by the robot 212 and places it on the lid 122. Specifically, the control device 214 grips and takes out the article from the container 24 with the hand 228 through the opening 26. Next, the control device 214 operates the robot 212 to move the hand 228 gripping the article above the through hole 128 of the lid 122 arranged in the open position and causes the hand 228 to release the article. As a result, the article is put into the through hole 128 from above and is adjusted to the orientation illustrated in FIG. 21 by the action of the orientation adjusting mechanism (the open and close door mechanism 126).

Thereafter, the control device 214 performs steps S8 and S10. Here, when step S10 is repeatedly performed, the robot 212 can grip articles in the same orientation with the hand 228 because the orientation adjusting mechanism (126) adjusts the orientations of articles temporarily placed on the lid 122. Then, when transporting and storing the article gripped by the hand 228 to and in the storage location, the robot 212 can arrange the article in the storage location in the same orientation. That is, according to the present embodiment, it is possible to adjust the orientations of a plurality of articles stored in the storage location. After step S10, the control device 214 performs steps S11 to S13.

Figure 23:
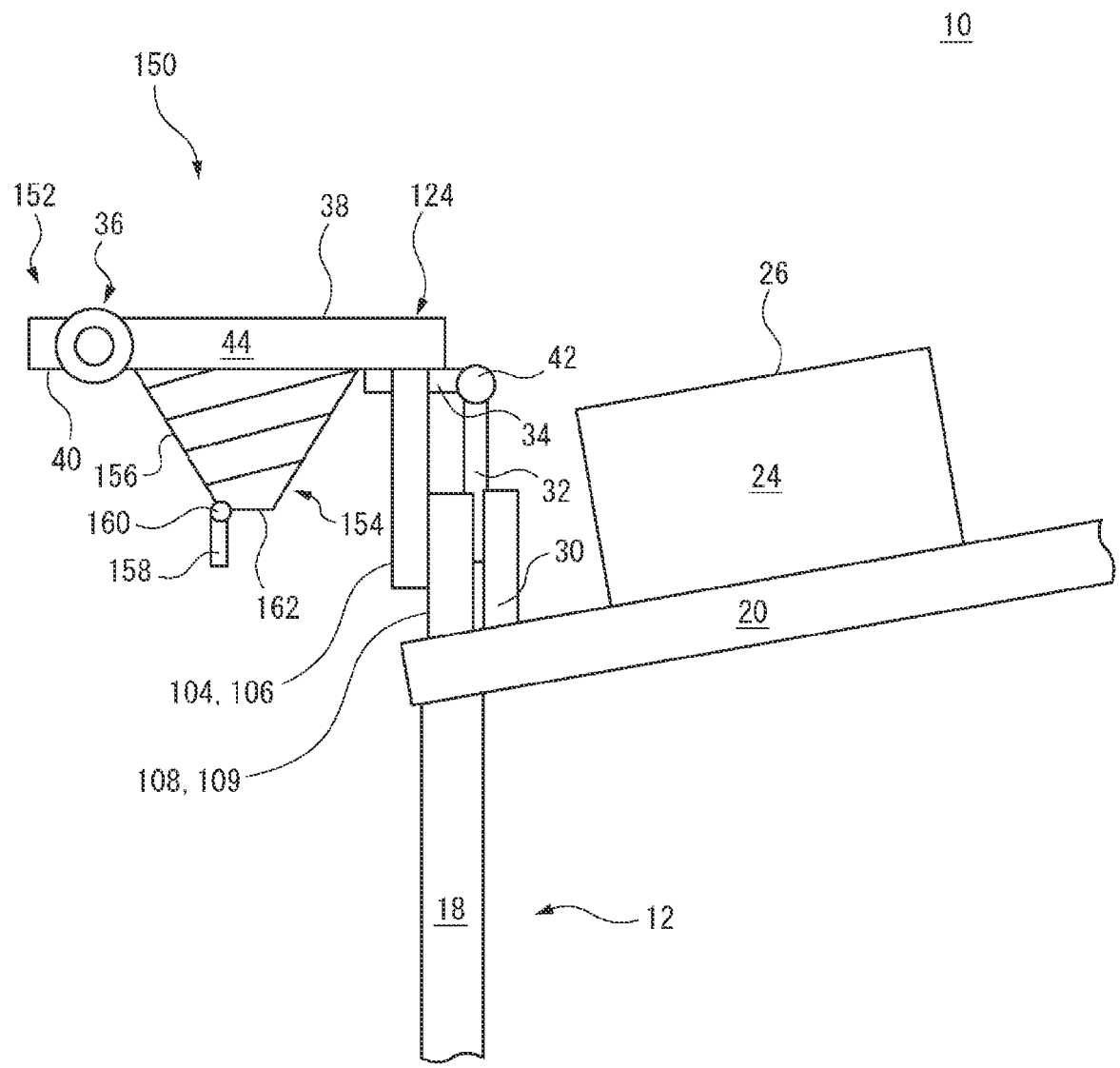
FIG. 23 is a diagram illustrating a state in which the lid mechanism illustrated in FIG. 22 has opened a lid.

The article storage apparatus 10 illustrated in FIGS. 22 to 24 can also be applied to the picking system 250. Also in this case, when step S5 in FIG. 35 is performed, the orientation of the article temporarily placed on the lid 152 can be adjusted to the orientation illustrated in FIG. 24 by the action of the orientation adjusting mechanism (the open and close door mechanism 154).

In the picking system 210 or 250 described above, the robot base 218 of the robot 212 may also be fixed on a traveling device (not illustrated). This traveling device moves the robot 212 in a direction parallel to the xy plane (horizontal plane) of the robot coordinate system C1.

Figure 2:
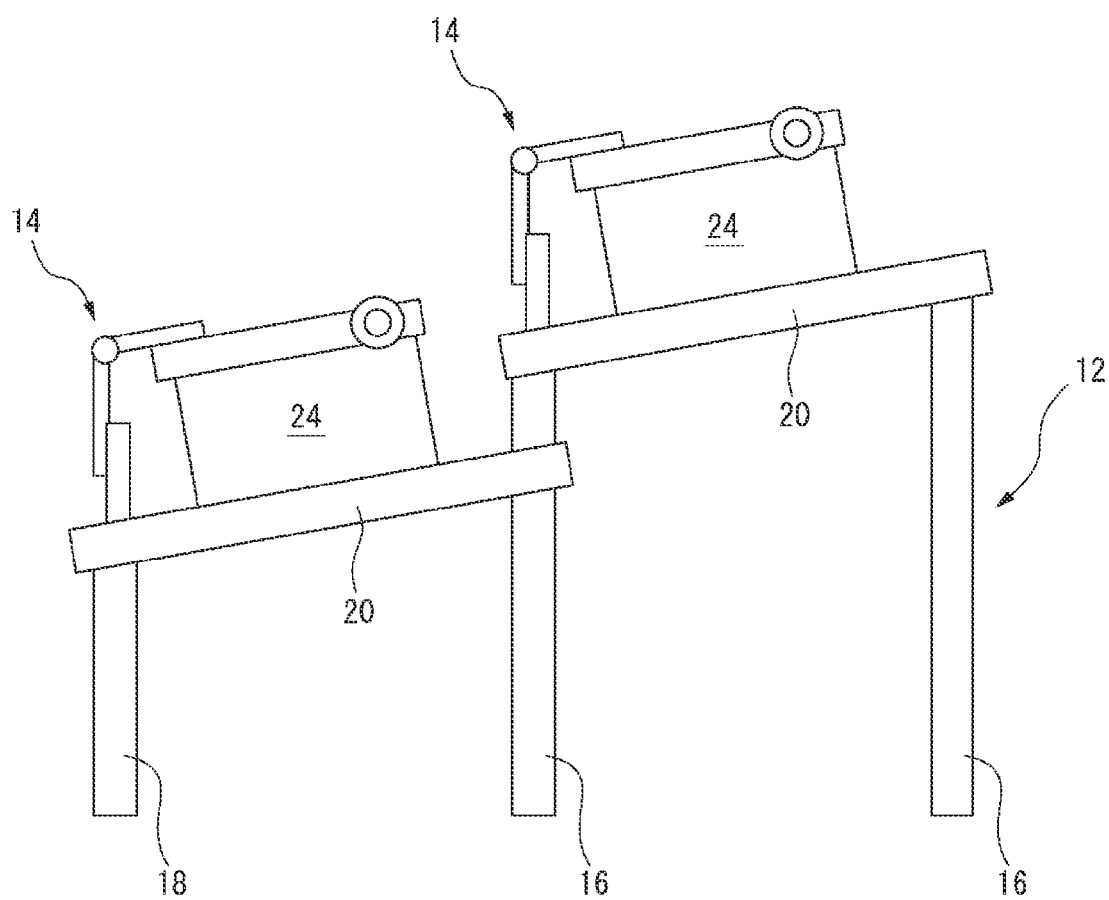
FIG. 2 is a side view of the article storage apparatus illustrated in FIG. 1.
Figure 31:
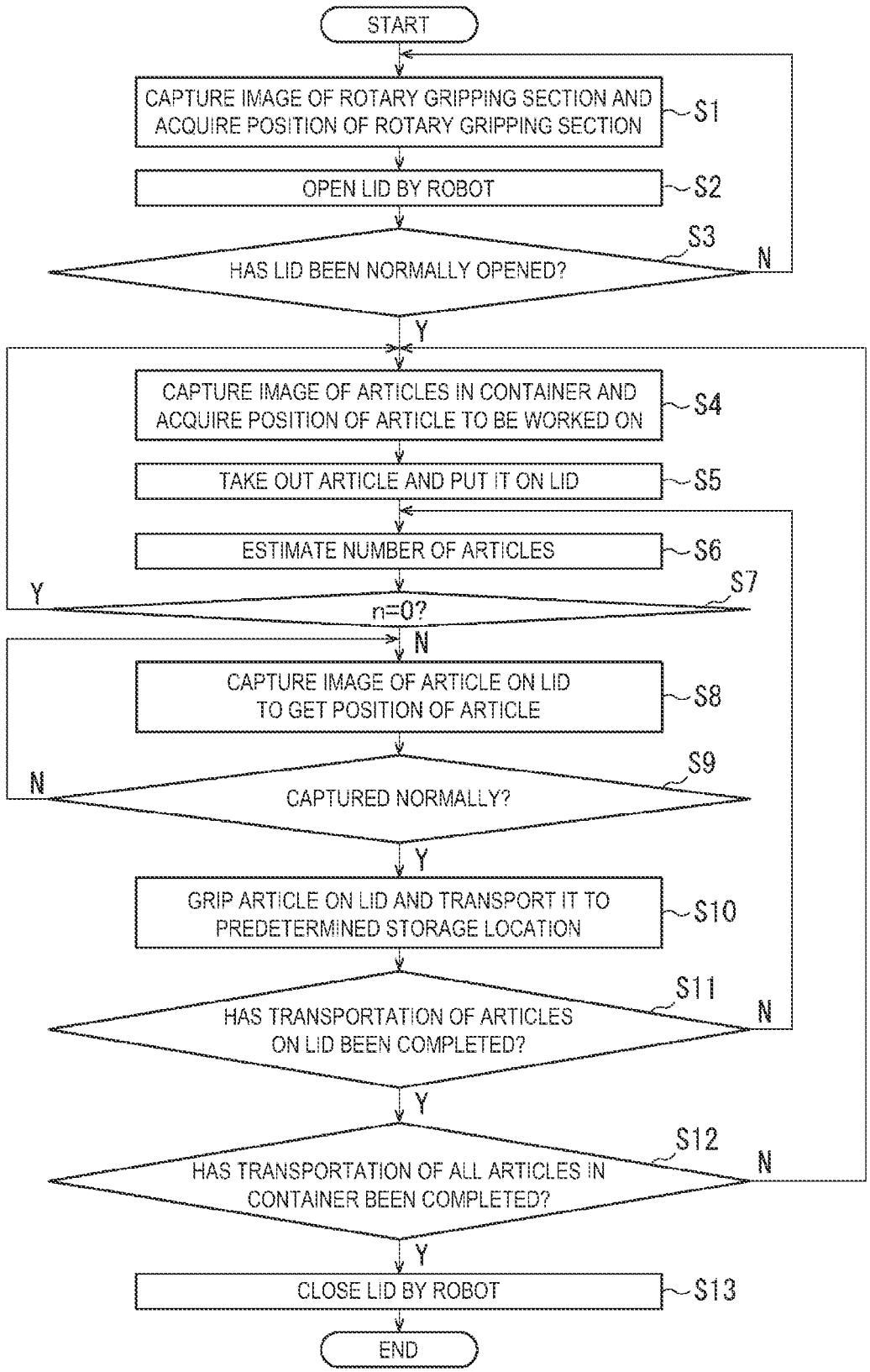
FIG. 31 is a flowchart illustrating an example of an operation process of the picking system illustrated in FIG. 29.

Then, when a plurality of containers 24 are arranged on the container installation frame 20 such that they are arrayed in the x-axis direction as illustrated in FIG. 1, the control device 214 may perform the process illustrated in FIG. 31 or FIG. 35 for each container 24 while operating the traveling device to move the robot 212 in the x-axis direction. In this case, the control device 214 may be built in the traveling device. The storage rack 170 described above may also be applied to the picking system 210 or 250. The lid mechanism 14, 50, 70, 100 or 110 of any of the forms described above may also be applied to the article storage apparatus 10 of the picking system 210.

The orientation adjusting mechanism is not limited to the open and close door mechanism 126 or the open and close door mechanism 154 and may have any structure that can adjust the orientation of an article placed on the lid. For example, as an orientation adjusting mechanism, a recess having the same outer shape as the outer shape of the article may be provided in the first surface 38 of the lid 28 to adjust the orientation of the article put into the recess.

The above embodiments have been described with respect to the case where the lid 28, 122, or 152 is opened or closed by rotating about the hinge shaft 42. However, without being limited to this, the lid 28, 122 or 152 may be provided, for example, such that it is slidable linearly in the x-axis direction or the y-axis direction and moves between a closed position and an open position by a sliding movement.

For example, the container installation frame 20 of the storage rack 12 (or 170) may be provided with a slide rail extending along the x-axis or the y-axis and the lid 28, 122 or 152 may be slidably provided on the slide rail. When the lid 28, 122 or 152 is arranged at one end of the slide rail, the lid 28, 122 or 152 may be arranged at a closed position where it closes the opening 26 of the container 24 arranged at the set position SP, while when it is arranged at the other end of the slide rail, it may be arranged in an open position where it opens the opening 26. The article storage apparatus 10 may further include a drive section (e.g., a servomotor) that drives the lid 28, 122, or 152 to be opened and closed.

The above embodiments have been described with respect to the case where the lid mechanism 14, 50, 70, 90, 100, 110, 120, or 150 is provided to the storage rack 12 or 170 as a member other than the containers 24. However, without being limited to this, the lid mechanism 14, 50, 70, 90, 100, 110, 120 or 150 may be provided at a member other than the containers 24 and the storage rack 12 (or 170).

For example, an outer frame extending parallel to the container installation frame 20 of the storage rack 12 (or 170) may be fixed in close proximity to (e.g., directly above) the container installation frame 20 (or 172). The outer frame may be separated from the storage rack 12 and fixed to the floor (or a pillar) of the work cell. Then, the lid mechanism 14, 50, 70, 90, 100, 110, 120 or 150 (specifically, the fixed member 30) may be fixed to the outer frame. Although the present disclosure has been described above through the embodiments, the above embodiments are not intended to limit the invention as set forth in the claims.

REFERENCE SIGNS LIST

10 ARTICLE STORAGE APPARATUS
12, 170 STORAGE RACK
14, 50, 70, 90, 100, 110, 120, 150 LID MECHANISM
24, 24A, 24B, 24C CONTAINER
26 OPENING
28, 122, 152 LID
30, 32, 52, 54, 72 FIXED MEMBER
34 MOVABLE MEMBER
36 ROTARY GRIPPING SECTION
210, 250 PICKING SYSTEM
212 ROBOT
214 CONTROL DEVICE

The invention claimed is:
1. An article storage apparatus comprising:
a storage rack on which a container having an opening is set, and which includes a container installation frame configured to support the set container from downward;
a fixed member arranged to separate rearward from the container set at a predetermined position on the storage rack, the fixed member being fixed to the container installation frame so as to extend upward from the container installation frame; and
a lid provided at the fixed member so as to be rotatable between a closed position where the lid closes the opening of the container arranged at the predetermined position and an open position where the lid is retracted from the closed position to open the opening,
wherein the lid is arranged to protrude frontward from the fixed member when being arranged at the closed position, while the lid is arranged to protrude rearward from the fixed member when being arranged at the open position.
2. The article storage apparatus of claim 1, further comprising
a movable member movably provided at the fixed member and fixed to the lid, the movable member causing the lid to reciprocate by a movement of the movable member with respect to the fixed member.
3. The article storage apparatus of claim 2, wherein the movable member is rotatably provided at the fixed member and causes the lid to reciprocate along an arc-shaped track by a rotational movement of the movable member with respect to the fixed member.

4. The article storage apparatus of claim 1, further comprising a movement restricting mechanism configured to restrict movement of the lid and hold the lid at the closed position or the open position when the lid is arranged at the closed position or the open position.

5. The article storage apparatus of claim 4, wherein the movement restricting mechanism includes an engaging portion provided at one of the lid and the separate member, and configured to engage the other of the lid and the separate member to restrict movement of the lid when the lid is arranged at the closed position or the open position.

6. An article storage apparatus comprising:
a storage rack on which a container having an opening is set; and
a lid provided at a separate member from the container, and reciprocable between a closed position where the lid closes the opening of the container arranged at a predetermined position on the storage rack and an open position where the lid is retracted from the closed position to open the opening further comprising:
a fixed member fixed to the separate member; and
a movable member movably provided at the fixed member and fixed to the lid, the movable member causing the lid to reciprocate by a movement of the movable member with respect to the fixed member, wherein the movable member is rotatably provided at the fixed member and causes the lid to reciprocate along an arc-shaped track by a rotational movement of the movable member with respect to the fixed member, wherein the movable member is fixed to one end of the lid, and a rotary gripping section is provided at the other end of the lid opposite to the one end of the lid.

7. An article storage apparatus comprising:
a storage rack on which a container having an opening is set; and
a lid provided at a separate member from the container, and reciprocable between a closed position where the lid closes the opening of the container arranged at a predetermined position on the storage rack and an open position where the lid is retracted from the closed position to open the opening further comprising:
a fixed member fixed to the separate member; and
a movable member movably provided at the fixed member and fixed to the lid, the movable member causing the lid to reciprocate by a movement of the movable member with respect to the fixed member, wherein the movable member is rotatably provided at the fixed member and causes the lid to reciprocate along an arc-shaped track by a rotational movement of the movable member with respect to the fixed member, wherein the fixed member and the movable member are arranged to face each other when the lid is arranged at the closed position or the open position,
wherein the article storage apparatus further comprising an elastic member provided at the fixed member or the movable member, and interposed between the fixed member and the movable member arranged to face each other.

8. An article storage apparatus comprising:
a storage rack on which a container having an opening is set; and
a lid provided at a separate member from the container, and reciprocable between a closed position where the lid closes the opening of the container arranged at a predetermined position on the storage rack and an open position where the lid is retracted from the closed position to open the opening, wherein the lid includes an orientation adjusting mechanism configured to adjust an orientation of an article placed on the lid when the lid is arranged at the open position.

9. The article storage apparatus of claim 8, wherein the orientation adjusting mechanism includes an open and close door mechanism configured to expand vertically downward to form a lid opening which receives the article when the lid is arranged at the open position, while closing the lid opening when the lid is arranged at the closed position.

10. An article storage apparatus comprising:
a storage rack on which a container having an opening is set; and
a lid provided at a separate member from the container, and reciprocable between a closed position where the lid closes the opening of the container arranged at a predetermined position on the storage rack and an open position where the lid is retracted from the closed position to open the opening, wherein the lid includes:
a first surface configured to face vertically upward when the lid is arranged at the open position, while closing the opening of the container when the lid is arranged at the closed position; and
a second surface opposite to the first surface,
wherein the first surface is formed with a concave-convex portion configured to prevent positional displacement of the article placed on the first surface when the lid is arranged at the open position.

11. An article storage apparatus comprising:
a storage rack on which a container having an opening is set; and
a lid provided at a separate member from the container, and reciprocable between a closed position where the lid closes the opening of the container arranged at a predetermined position on the storage rack and an open position where the lid is retracted from the closed position to open the opening, wherein the lid includes:
a first surface configured to face vertically upward when the lid is arranged at the open position, while closing the opening of the container when the lid is arranged at the closed position; and
a second surface opposite to the first surface,
wherein an elastic covering is provided on the first surface.

12. An article storage apparatus comprising:
a storage rack on which a container having an opening is set; and
a lid provided at a separate member from the container, and reciprocable between a closed position where the lid closes the opening of the container arranged at a predetermined position on the storage rack and an open position where the lid is retracted from the closed position to open the opening, further comprising a mass sensor configured to detect a mass of the lid or an article placed on the lid when the lid is arranged at the open position.

13. An article storage apparatus comprising:
a storage rack on which a container having an opening is set; and
a lid provided at a separate member from the container, and reciprocable between a closed position where the lid closes the opening of the container arranged at a predetermined position on the storage rack and an open position where the lid is retracted from the closed position to open the opening, wherein the storage rack includes:
- a guide mechanism configured to guide the container placed on the storage rack so as to move toward the predetermined position by an action of gravity; and
- a stopper mechanism configured to, when one container reaches the predetermined position by the guide mechanism, restrict movement of the other container following the one container in a direction toward the predetermined position, thereby separating the one container and the other container from each other.

14. An article storage apparatus comprising:
a storage rack on which a container having an opening is set; and
a lid provided at a separate member from the container, and reciprocable between a closed position where the lid closes the opening of the container arranged at a predetermined position on the storage rack and an open position where the lid is retracted from the closed position to open the opening; and
a robot including a hand capable of gripping the lid, and configured to move the lid between the closed position and the open position, the robot being configured to grip, by the hand, an article stored in the container through the opening when the lid is arranged at the open position, and pick up the article.

* * * * *